US012592873B2

(12) United States Patent
Johnson et al.

(10) Patent No.: US 12,592,873 B2
(45) Date of Patent: Mar. 31, 2026

(54) AUTONOMOUS VEHICLE EDGE DEVICES DIAGNOSTICS FRAMEWORK

(71) Applicant: GM Cruise Holdings LLC, San Francisco, CA (US)

(72) Inventors: Christopher Allen Johnson, Clever, MO (US); Matthew Fornero, Berkeley, CA (US); Pierre Souillot, Berkeley, CA (US); Malik Saafir, Oakland, CA (US)

(73) Assignee: GM CRUISE HOLDINGS LLC, San Francisco, CA (US)

( * ) Notice: Subject to any disclaimer, the term of this patent is extended or adjusted under 35 U.S.C. 154(b) by 0 days.

(21) Appl. No.: 18/343,140

(22) Filed: Jun. 28, 2023

(65) Prior Publication Data

US 2025/0007799 A1     Jan. 2, 2025

(51) Int. Cl.
| | |
|---|---|
| *H04L 12/24* | (2006.01) |
| *H04L 41/0803* | (2022.01) |
| *H04L 43/08* | (2022.01) |
| *H04L 67/12* | (2022.01) |

(52) U.S. Cl.
CPC .............. *H04L 43/08* (2013.01); *H04L 67/12* (2013.01)

(58) Field of Classification Search
CPC ................................ H04L 43/08; H04L 67/12
USPC ........................................................ 709/224
See application file for complete search history.

(56) References Cited

U.S. PATENT DOCUMENTS

| | | | | |
|---|---|---|---|---|
| 11,553,043 | B1 * | 1/2023 | Foust | B60W 50/04 |
| 12,172,571 | B2 * | 12/2024 | Hinricher | B60Q 1/543 |

| | | | | |
|---|---|---|---|---|
| 2009/0287920 | A1 * | 11/2009 | Fernandez | H04L 63/0428 709/227 |
| 2017/0004710 | A1 * | 1/2017 | Dozono | G07F 17/24 |
| 2017/0139411 | A1 * | 5/2017 | Hartung | G05D 1/87 |
| 2018/0054490 | A1 * | 2/2018 | Wadhwa | G08G 1/0129 |
| 2019/0113916 | A1 * | 4/2019 | Guo | A61B 5/6893 |
| 2019/0250611 | A1 * | 8/2019 | Costin | G05D 1/228 |

(Continued)

FOREIGN PATENT DOCUMENTS

| | | | | |
|---|---|---|---|---|
| CN | 114979188 | A * | 8/2022 | H04L 43/10 |
| WO | WO-2018039238 | A1 * | 3/2018 | H04L 63/0428 |
| WO | WO-2023231993 | A1 * | 12/2023 | |

*Primary Examiner* — Ario Etienne
*Assistant Examiner* — Elizabeth Kassa
(74) *Attorney, Agent, or Firm* — CANTOR COLBURN LLP

(57) ABSTRACT

Vehicles, e.g., autonomous vehicles, can have sophisticated networked systems onboard. A networked system for a vehicle may include many edge devices, such as sensors, network devices, microcontrollers, boards, operating systems, etc. Many edge devices may report health status information to help vehicles achieve a certain integrity level and safety goals. The health status information may be collected and processed by a compute system to assess whether certain flags or alerts should be raised, and whether the vehicle should enter a degraded state of operation. It is not trivial to implement an effective and efficient framework that can manage many edge devices in a networked system reporting a high volume of health status information. An edge devices diagnostics framework may ensure reliable transmission of health status information, mechanisms for fault injection, and the use of configuration templates to standardize and simplify configuration of monitors for various edge devices.

18 Claims, 14 Drawing Sheets

(56) References Cited

U.S. PATENT DOCUMENTS

| | | | |
|---|---|---|---|
| 2020/0410782 A1* | 12/2020 | Duarte Gelvez | G06Q 50/40 |
| 2021/0156529 A1* | 5/2021 | Selevan | F21L 2/00 |
| 2023/0322244 A1* | 10/2023 | Luo | B60W 50/14 |
| | | | 701/29.2 |
| 2023/0353631 A1* | 11/2023 | Gebhardt | H04L 67/55 |
| 2023/0403759 A1* | 12/2023 | Li | H04W 76/40 |
| 2024/0042925 A1* | 2/2024 | Hinricher | G07C 5/0825 |

* cited by examiner

```yaml
BrandingA:
    monitor_1:
        STATIC:
            ip_address: "192.168.1.2"
    monitor_2:
        STATIC:
            ip_address: "10.1.1.51"
```

FIGURE 7A

```yaml
BrandingB:
    monitor_3:
        STATIC:
            ip_address: "192.168.1.2"
        DYNAMIC:
            peer_ip: "dynamic_params.peer_ip"
    monitor_4:
        STATIC:
            ip_address: "10.1.1.51"
            peer_ip: "10.1.1.52"
```

FIGURE 7B

OUTPUT PAYLOADS 802

AGGREGATE THE PAYLOADS 804

TRANSMIT UDP PACKETS HAVING THE AGGREGATED PAYLOADS OVER A NETWORK 806

RECEIVE THE UDP PACKETS OVER THE NETWORK 808

PUBLISH MEASUREMENTS OF THE EDGE DEVICE TO DATA TOPIC(S) 810

SUBSCRIBE TO DATA TOPIC(S) 812

DETERMINE WHETHER THE VEHICLE IS IN A DEGRADED STATE 814

MONITOR DATA ABOUT EDGE DEVICE 902

CHECK THE DATA AGAINST A THRESHOLD 904

PERIODICALLY OUTPUT PAYLOADS HAVING EDGE DEVICE HEALTH STATUS BASED ON THE CHECKING 906

AGGREGATE THE PAYLOADS FROM THE PLURALITY OF MONITORS 908

TRANSMIT UDP PACKETS HAVING THE AGGREGATED PAYLOADS OVER A NETWORK TO A DIAGNOSTICS DRIVER ON A COMPUTE SYSTEM OF A VEHICLE 910

PUBLISH PAYLOADS 1102

CAPTURE PAYLOADS 1104

FORM AGGREGATED PAYLOADS 1106

TRANSMIT UDP PACKETS HAVING THE AGGREGATED PAYLOADS 1108

RECEIVE AND RESPOND TO REQUESTS ABOUT ONE OR MORE OF: THE MONITORS AND THE AGGREGATOR 1110

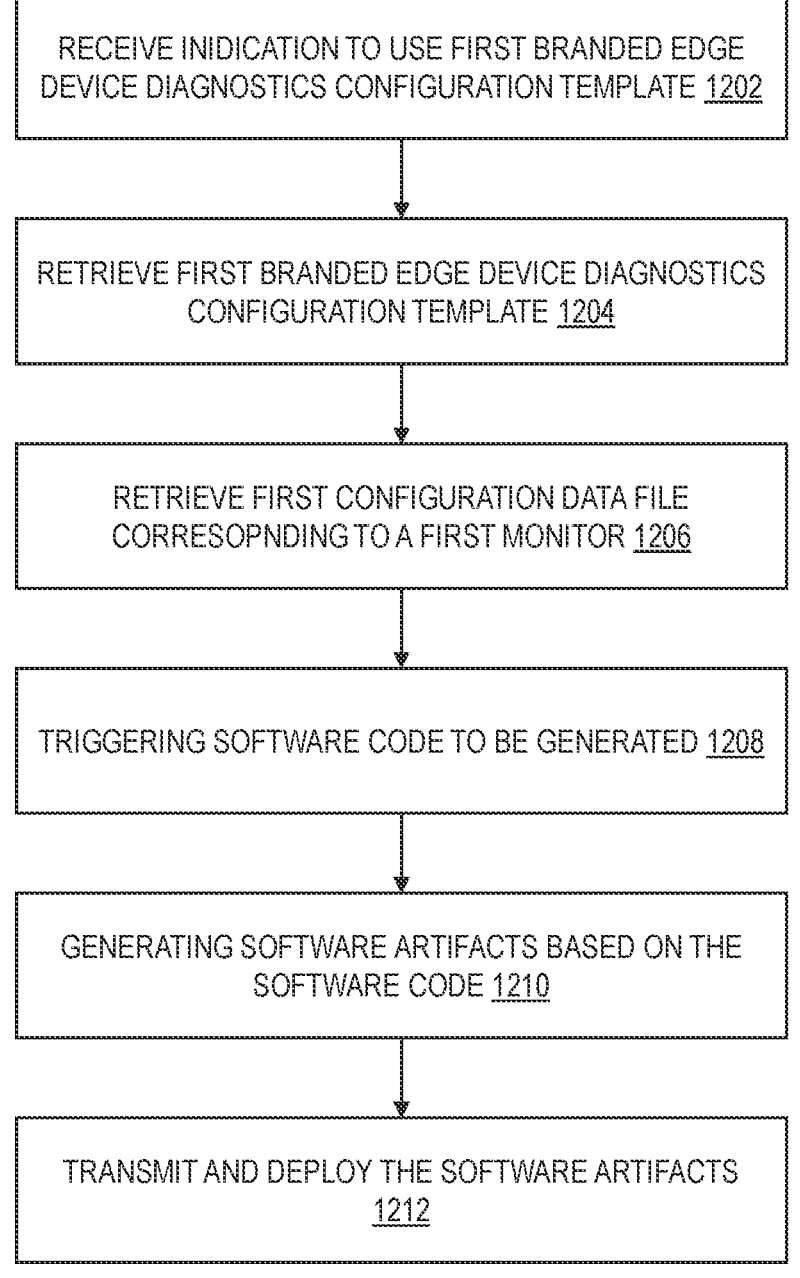

RECEIVE INIDICATION TO USE FIRST BRANDED EDGE DEVICE DIAGNOSTICS CONFIGURATION TEMPLATE 1202

RETRIEVE FIRST BRANDED EDGE DEVICE DIAGNOSTICS CONFIGURATION TEMPLATE 1204

RETRIEVE FIRST CONFIGURATION DATA FILE CORRESOPNDING TO A FIRST MONITOR 1206

TRIGGERING SOFTWARE CODE TO BE GENERATED 1208

GENERATING SOFTWARE ARTIFACTS BASED ON THE SOFTWARE CODE 1210

TRANSMIT AND DEPLOY THE SOFTWARE ARTIFACTS 1212

FIGURE 12

AUTONOMOUS VEHICLE EDGE DEVICES DIAGNOSTICS FRAMEWORK

BACKGROUND

Technical Field

The present disclosure relates to autonomous vehicles and, more specifically, to an edge devices diagnostics framework in autonomous vehicles.

Introduction

Autonomous vehicles (AVs), also known as self-driving cars, and driverless vehicles, may be vehicles that use multiple sensors to sense the environment and move without human input. Automation technology in AVs may enable the vehicles to drive on roadways and to perceive the vehicle's environment accurately and quickly, including obstacles, signs, and traffic lights. Autonomous technology may utilize geographical information and semantic objects (such as parking spots, lane boundaries, intersections, crosswalks, stop signs, traffic lights) for facilitating vehicles in making driving decisions. The vehicles can be used to pick-up passengers and drive the passengers to selected destinations. The vehicles can also be used to pick-up packages and/or other goods and deliver the packages and/or goods to selected destinations.

BRIEF DESCRIPTION OF THE DRAWINGS

The various advantages and features of the present technology will become apparent by reference to specific implementations illustrated in the appended drawings. A person of ordinary skill in the art will understand that these drawings show only some examples of the present technology and would not limit the scope of the present technology to these examples. Furthermore, the skilled artisan will appreciate the principles of the present technology as described and explained with additional specificity and detail through the use of the accompanying drawings.

FIGS. 7A-B illustrate exemplary branded edge device diagnostics configuration files, according to some aspects of the disclosed technology.

FIG. 12 is a flow diagram illustrating an exemplary method for building and deploying software artifacts for edge devices diagnostics for AVs, according to some aspects of the disclosed technology.

DETAILED DESCRIPTION

Figure 1:
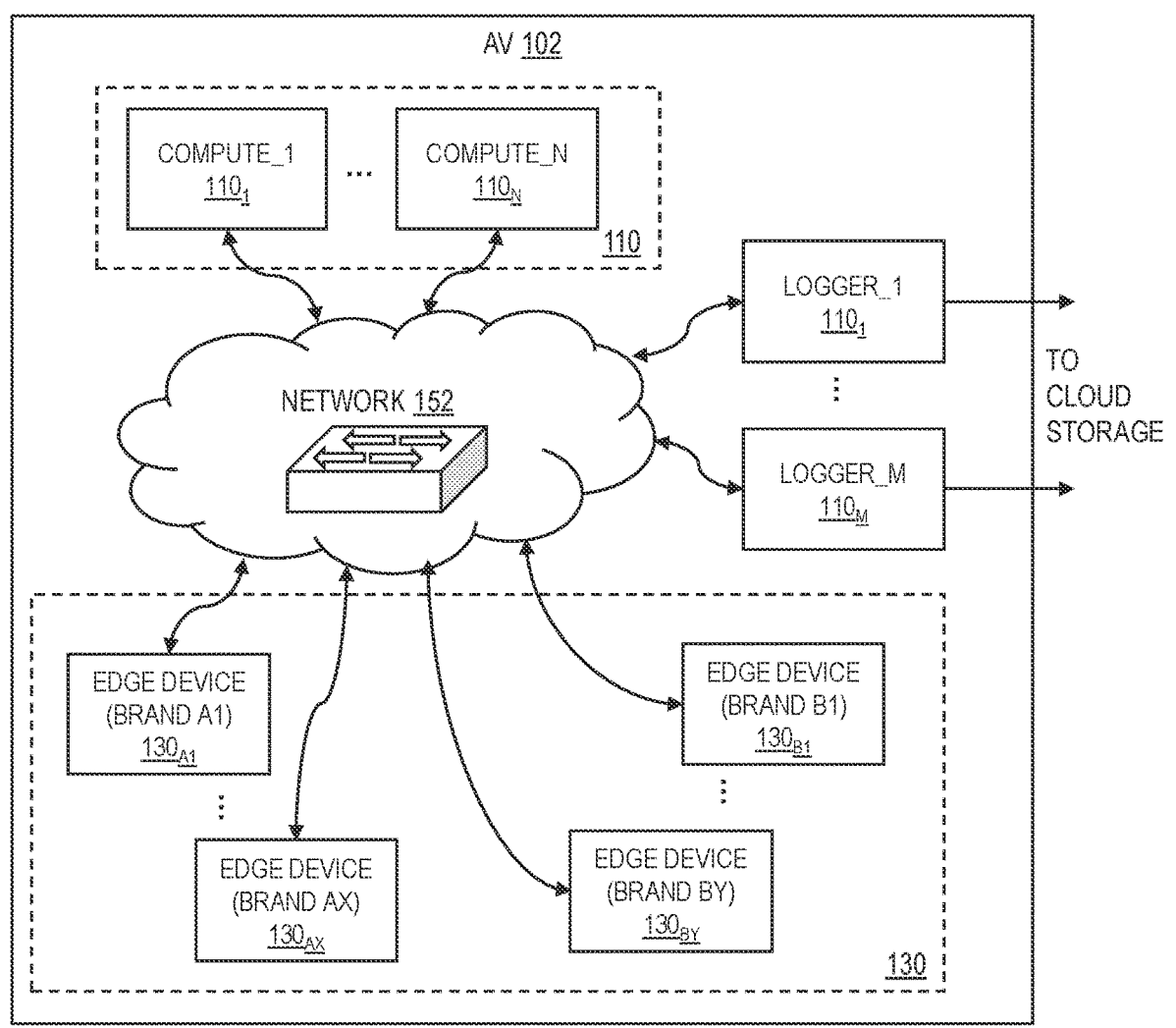
FIG. 1 illustrates a networked computing system in an AV, according to some aspects of the disclosed technology.

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a more thorough understanding of the subject technology. However, it will be clear and apparent that the subject technology is not limited to the specific details set forth herein and may be practiced without these details. In some instances, structures and components are shown in block diagram form to avoid obscuring the concepts of the subject technology.

Overview

AVs can provide many benefits. For instance, AVs may have the potential to transform urban living by offering opportunities for efficient, accessible, and affordable transportation. An AV may be equipped with various sensors to sense an environment surrounding the AV and collect information (e.g., sensor data) to assist the AV in making driving decisions. To that end, the collected information or sensor data may be processed and analyzed to determine a perception of the AV's surroundings, extract information related to navigation, and predict future motions of the AV and/or other traveling agents in the AV's vicinity. The predictions may be used to plan a path for the AV (e.g., from a starting position to a destination). As part of planning, the AV may access map information and localize itself based on location information (e.g., from location sensors) and the map information. Subsequently, instructions can be sent to a controller to control the AV (e.g., for steering, accelerating, decelerating, braking, etc.) according to the planned path. The operations of perception, prediction, planning, and control at an AV may be implemented using a combination of hardware and software components, together forming an AV compute system.

Vehicles, e.g., AVs, can have sophisticated networked systems onboard. A networked system for a vehicle may include many edge devices or components (referred herein as edge devices) onboard the AV, such as sensors, network devices, microcontrollers, boards, operating systems, etc. To perform operations of perception, prediction, planning, and control, an AV compute system utilizes data generated by these edge devices and proper execution of functionalities by these edge devices. The health status of these edge devices, if abnormal, can impact the AV compute's ability to perform these operations. Therefore, edge devices' health status information may inform a diagnostics system whether the AV is operating normally or is expected to operate normally.

Many edge devices or components may report health status information to help AVs achieve a certain integrity level and safety goals. The health status information may be generated at an edge device and transmitted to a compute system over a network. The compute system can collect and process the health status information to assess and diagnose whether certain flags or alerts should be raised, and whether the vehicle should enter a degraded state of operation. It is not trivial to implement an effective and efficient framework that can manage many edge devices in a networked system reporting a high volume of health status information. One challenge is that the edge devices are reporting many types of health status information, and the format of the health status information being reported may not always been standardized. Another challenge is that some systems may rely on custom software code to be written for each one of the edge device, which can be resource intensive and difficult to control. Yet another challenge is that the volume of health status information can be very high, which may impose traffic load on the network in the AV. There may be a need to query whether health status information is being reported correctly. In addition, there may be a need to inject (artificial) faults at the edge device to test whether the diagnostics system is operating properly.

An edge devices diagnostics system or framework may include mechanisms to ensure reliable transmission of health status information. Different tasks to be performed by the edge devices diagnostics system is carried out by monitors and an aggregator on each edge device, and diagnostics drivers implemented on the AV compute system that are dedicated to collect information sent by the respective aggregators.

The edge devices diagnostics system further includes interfaces and webservers so that the state of the various components can be queried, and configuration of the various components can be modified. The interfaces and webservers may implement mechanisms for fault injection.

To make it easier to implement and deploy the edge devices diagnostics system, configuration data files can be used to configure thresholds for monitors, and branded edge device diagnostics configuration files can be used to standardize and simplify configuration of monitors for various edge devices. A build system can generate software code and software artifacts from the configuration data files and branded edge device diagnostics configuration files. At runtime, the compute system launches diagnostics drivers for various edge devices and gathers information from the various edge devices about the health status information being monitored to compile a watchdog configuration file. Using the watchdog configuration file, the watchdog is aware of what types of health status information is expected and can trigger degraded states of the AV accordingly.

While some embodiments described herein relate to an AV, it is envisioned by the disclosure that the embodiments can be implemented for vehicles more generally (including semi-autonomous vehicles, vehicles with edge devices and a compute system, electric vehicles, hybrid gas-electric, vehicles, etc.). The embodiments can be implemented for other types of vehicles, such as aircrafts, ships, trains, trams, utility vehicles, construction/heavy duty vehicles, submarine, etc.

Exemplary Networked Computing System in an AV

FIG. 1 illustrates a networked computing system in an AV, according to some aspects of the disclosed technology. AV 102 may include one or more compute systems 110, shown as compute_1 $110_1$, . . . compute_N $110_N$. Multiple compute systems may be provided for redundancy reasons. In some embodiments, a single compute system is operating at a given point in time. AV 102 may include one or more edge devices 130. An edge device is a device or component that performs one or more functions at the edge of a networked computing system. An edge device may be communicably coupled to one or more main processing units of a compute system. One or more edge devices 130 may include sensors of AV 102, such as a plurality of cameras, a plurality of light detection and ranging (LIDAR) sensors, a plurality of radio detection and ranging (RADAR) sensors, a plurality of ultrasonics sensors, a plurality of time-of-flight (TOF) sensors, a board having processing units of a compute system mounted thereon, an operating system of the compute system, a non-transient computer-readable storage device, a network device, an audio system, cabin entertainment system, impact sensor system, etc.

It is desirable for one or more edge devices 130 to report edge device health status (or health status information) to, e.g., compute systems of AV 102. Health status information may include data generated periodically. Health status information may include an indication of whether the data has crossed a threshold. Health status information may include whether a timeout has occurred. Examples of health status information includes: processor utilization (e.g., a percentage), memory utilization (e.g., a percentage), number of memory errors, voltage, temperature, error codes, failure codes, error/fault/occurrence counter, a certain value crossing a threshold, a timeout occurring.

In some cases, one or more edge devices 103 may be branded. Branding may be appropriate for edge devices of a same kind/type (e.g., the edge devices are all 180 field-of-view color cameras, the edge devices are all RADAR sensors, the edge devices are all LIDAR sensors). The edge devices may be branded if the edge devices can share the same edge device diagnostics configuration (e.g., same set of health status information being monitored) for purposes of building the software artifacts that implement edge devices diagnostics. As illustrated, AV 102 has edge devices that may have brand A (shown as edge device brand A1 $130_{A1}$, . . . edge device brand AX $130_{AX}$), and edge devices that may have brand B (shown as edge device brand B1 $130_{B1}$, . . . edge device brand BY $150_{BY}$). Edge devices do not necessarily have to be branded. Details relating to branding are described with FIGS. 7A-B.

AV 102 can include a network 152, which may have one or more network devices (e.g., a network switch, a network hub, etc.) implemented thereon. One or more edge devices 130 may communicate with the one or more compute systems 110 via network 152.

AV 102 may include one or more loggers (shown as logger_1 $110_1$, . . . logger_M $110_M$). Loggers may capture network data, such as information transmitted by the edge devices and the compute systems on the network 152, and store the network data on non-transient computer-readable storage devices on AV 102. If appropriate, the data may be offloaded to external non-transient computer-readable storage devices (e.g., a hard drive, cloud storage, etc.).

AV 102 thus has a networked computing system involving one or more compute systems 110, a network 152, one or more edge devices 130, and optionally one or more loggers. An edge device diagnostics system may perform tasks such as the one or more edge devices 130 generating health status information and a compute system 110 collecting and processing the health status information from various edge devices 130. Implementing a framework for edge devices diagnostics is not a trivial task.

Exemplary Implementations of Edge Devices Diagnostics System

Figure 2:
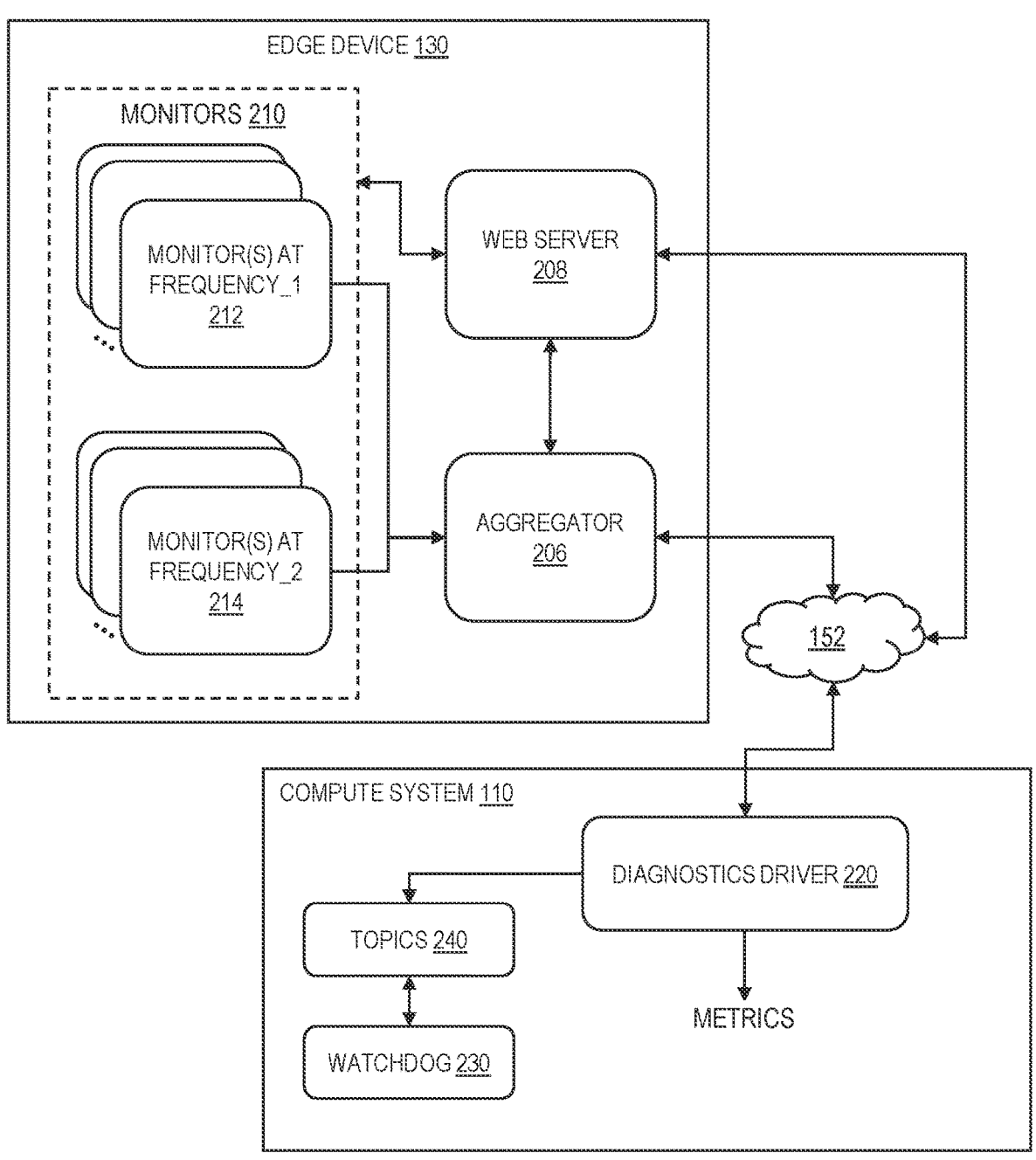
FIG. 2 illustrates an edge device diagnostics system implemented on the networked computing system of an AV, according to some aspects of the disclosed technology.

FIG. 2 illustrates an edge devices diagnostics system implemented on the networked computing system of an AV, according to some aspects of the disclosed technology. The networked computing system includes one or more edge devices and one or more compute systems. For simplicity, the networked computing system in FIG. 2 includes an exemplary edge device (e.g., edge device 130) and an exemplary compute system (shown as compute system 110). The edge device 130 and compute system 110 may communicate with each other over network 152. It is envisioned that other edge devices may be implemented in a same or similar fashion as edge device 130. It is envisioned that other compute system(s) may be implemented in a same or similar fashion as compute system 110.

Edge device 130 may include one or more monitors 210. In some embodiments, edge device 130 includes a plurality of monitors 210. Monitors 210 may output (or publish) payloads having edge device health status. Monitors 210 can determine health status information of edge device 130 and report the health status information as payloads. In some embodiments, a monitor may monitor data about edge device 130, and check the data against a (configured) threshold. The threshold may be defined in a configuration information for the monitor. The monitor may periodically output payloads having edge device health status based on the checking. In some embodiments, monitors 210 includes a first monitor to periodically output first payloads having first edge device health status (e.g., temperature), and a second monitor to periodically output second payloads having second edge device health status (e.g., voltage).

Monitors may operate (e.g., report payloads) at different cadences or frequencies. As illustrated, monitors 210 may include one or more monitors operating at frequency_1 212, and one or more monitors operating at frequency_1 214. In some embodiments, monitors 210 includes a first monitor operating at a first frequency (e.g., 10 Hz), and a second monitor operating at a second frequency different from the first frequency (e.g., 1 Hz).

Monitors 210 may have corresponding configurations (e.g., defined by configuration data files). A configuration for a monitor may include a name of the monitor, the rate/frequency at which the monitor operates or reports payloads, the data about the edge device being monitored, (optionally) measurement configuration of the monitor. In some cases, the data about the edge device being monitored may include an identification of the data being monitored (e.g., temperature). The data about the edge device being monitored may include status flags. The data about the edge device being monitored may include severity corresponding to status flags. The data about the edge device being monitored may include an identification of health status information derived from the data being monitored. Exemplary identifications of health status information may include, e.g., processor utilization, amount of time the processor utilization is above a certain threshold, occurrence count of processor utilization crossing a threshold, etc. The measurement configuration of the monitor may include one or more thresholds. The measurement configuration of the monitor may include one or more timeouts configurations. A timeout configuration may include information specifying the monitor to determine a timeout has occurred if an event does not occur for a specified time period.

Monitors 210 may produce payloads having the edge device health status. Edge device health status may encompass the data about the edge device being monitored (e.g., raw data, status flags, etc.). Edge device health status may encompass any one or more examples of health status information described herein (e.g., a certain value crossing a threshold, an error/fault/occurrence count, a timeout occurring, etc.). The payloads may be standardized to have a certain format. A payload generated by a monitor may include a name of the monitor, a timestamp (e.g., corresponding to a time when the monitor acquires the data), and edge device health status information. In some cases, the payloads may include a sequence number. Edge device health status information may include, e.g., data being monitored, a status flag, occurrence count, etc. Monitors 210 may transmit payloads to a consumer of the payloads (e.g., aggregator 206 or other components of edge device 130) using an inter-process communication channel (e.g., ZeroMQ).

Figure 3:
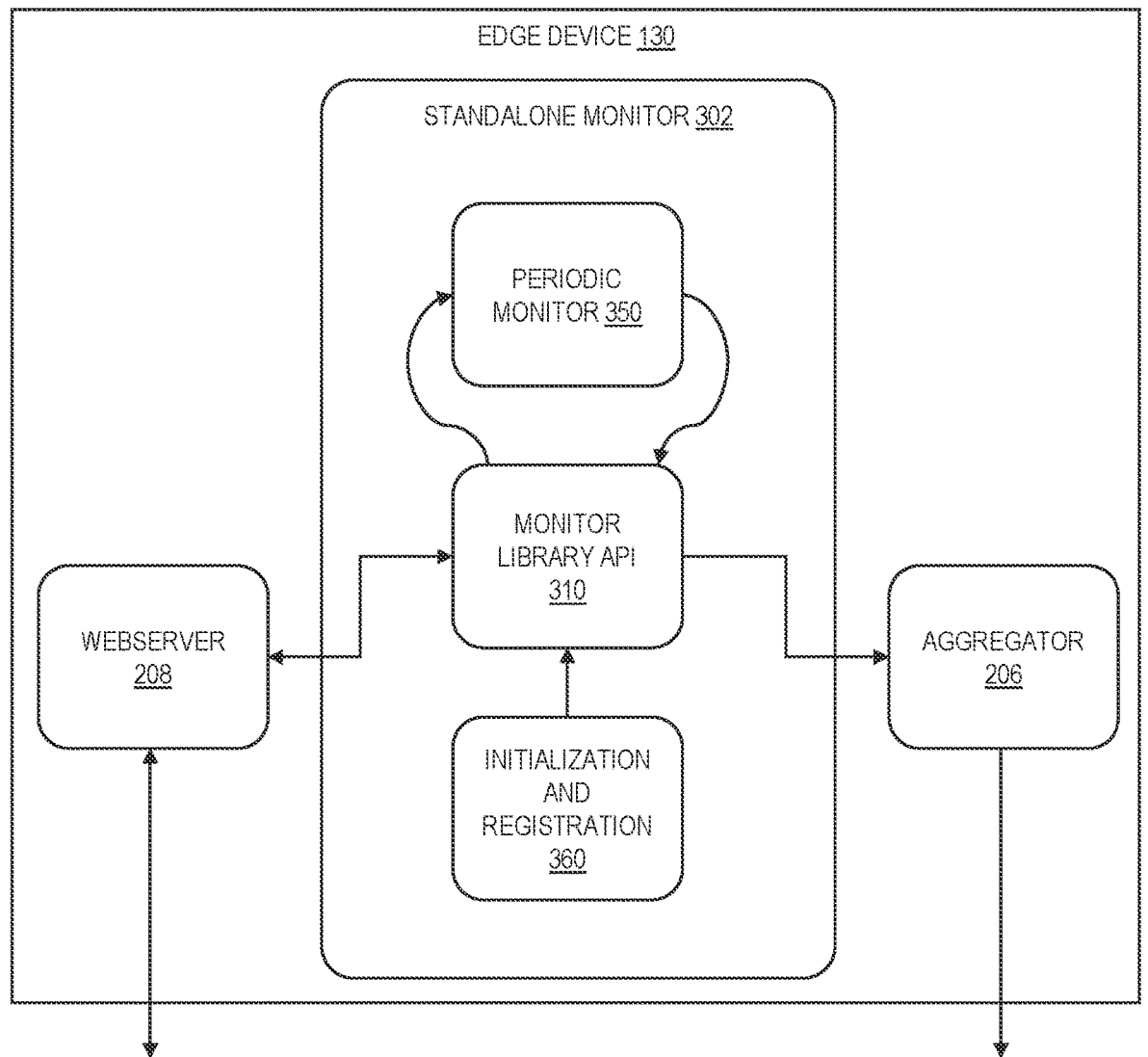
FIG. 3 illustrates an exemplary standalone monitor implemented on an edge device, according to some aspects of the disclosed technology.

In some cases, a monitor may be a standalone monitor, whose details are described with FIG. 3. In some cases, a monitor may be a nested monitor, whose details are described with FIG. 4.

Edge device 130 may include an aggregator 206. Aggregator 206 can serve as destination for monitors 210 to report into. Aggregator 206 may send aggregated data collected from the monitors 210 to compute system 110. Aggregator 206 may aggregate the payloads from the plurality of monitors 210 and to transmit User Datagram Protocol (UDP) packets having the aggregated payloads over network 152, e.g., to a compute system 110. In some embodiments, aggregator 206 may capture the payloads from the plurality of monitors 210. Aggregator 206 may form aggregated payloads having the (captured) payloads. Aggregator 206 may transmit UDP packets having the aggregated payloads over network 152 to a diagnostics driver 220 on a compute system 110 of a vehicle. UDP may be preferred over other protocols such as Transmission Control Protocol (TCP) because UDP is efficient and lightweight, which may be beneficial for transporting data that is being transmitted frequently. Additionally, the UDP packets may be multicast packets, which means that the packets may be intended for multiple recipients on network 152 (e.g., compute system 110, one of the loggers illustrated in FIG. 1, etc.). In some cases, aggregator 206 may fragment/truncate/chunk aggregated payloads into multiple UDP packets, depending on transport limitations of the network 152 (e.g., maximum packet size that can be sent over the network). Aggregator 206 may operate at a certain output rate and/or form UDP packets with the aggregated payloads in a manner that takes throughput of the network 152 into account to increase efficiency of the network 152. Details of aggregator 206 are described further with FIGS. 5-6.

Edge device 130 may include a webserver 208. Webserver 208 may implement an application programming interface (API) that conforms with design principles of representational state transfer (REST) architectural style. Webserver 208 serves as an interface defining a set of rules for requestors to interact with one or more of the monitors 210 and aggregator 206. Webserver may receive requests and generate responses having information about one or more of:

the aggregator, and the plurality of monitors. Webserver 208 may report overall edge device diagnostics status and/or edge device diagnostics status information (e.g., status of one or more of the monitors 210 and aggregator 206). Webserver 208 may discover information about monitors 210 configured for edge device 130 at runtime. Webserver 208 may allow requestors to request fault injection in one or more of the monitors 210 and aggregator 206. A request for fault injection may include a name of the monitor to which fault is to be injected, and a set of one or more key-value pairs that specify the information for the fault to be injected. Webserver 208 may allow requestors to request changes to be made to one or more of the monitors 210 and aggregator 206. A request for changes to be made may include a name of the monitor to which a change is to be made, and a set of one or more key-value pairs that specify the change to be made (e.g., identification of a configuration of the monitor and a value for the configuration). Webserver 208 may be communicably coupled to one or more of: the monitors 210 and the aggregator 206. Webserver 208 may serve as an interface for requestors to query (e.g., request information from) the one or more of: the monitors 210 and the aggregator 206. Webserver 208 may serve as an interface for requestors to make changes to the one or more of: the monitors 210 and the aggregator 206. In some embodiments, webserver 208 may discover the monitors 210 configured for the edge device at runtime and may report which monitors 210 have been configured. In some embodiments, webserver 208 may discover configuration information corresponding to the monitors and reports the configuration information. Further details relating to webserver 208 are described with FIGS. 2-5.

Compute system 110 may include a diagnostics driver 220. Diagnostics driver 220 may be a node running on compute system 110. Diagnostics driver 220 may be a robot operating system node. A diagnostics driver 220 may be launched for each edge device, or each aggregator such as aggregator 206. Diagnostics driver 220 may be dedicated to the aggregator 206, and can listen for the packets having the aggregated payloads sent by the aggregator 206. In practice, compute system 110 has a plurality of diagnostics drivers launched for individual edge devices reporting information. Diagnostics driver 220 may be one of the recipients of the UDP packets having the aggregated payloads and listen for the UDP packets data traffic. Diagnostics driver 220 may publish or output health status information received in the data traffic as measurements to topics 240. Other diagnostic drivers may also publish or output health status information to topics 240. Measurements of a diagnostics driver 220 (named edd1) may be published or output in a topic in topics 240 according to the following format 'edd1/<edge device name>/<measurement>'. The measurements may be published as an array of key-value pairs. Particular measurements corresponding to a specific monitor may be published in a topic in topics 240 according to the following format 'edd1/<edge device name>/<monitor name>/<measurement name>' or 'edd1/<edge device name>/<monitor name>/<namespace>/<measurement name>'. Examples of topics 240 can include 'edd1/dma_camera_channel/writeFifoSize" and 'edd1/dma_iio/temp0". Diagnostic driver 220 may publish a measurement if the data is not stale (e.g., determined using a sequence counter of the aggregated payloads). In some cases, diagnostics driver 220 may process data in the UDP packets, and generate one or more metrics based on the data. Metrics may be used for ongoing health status information gathering, tracking, and monitoring, and may not necessarily trigger the AV to enter into a degraded state.

In some cases, diagnostics driver 220 may set node diagnostic status according to a worst severity reported by edge device 130. In some cases, diagnostic driver 220 may publish status information about the diagnostic driver 220, e.g., whether a fault has occurred in diagnostic driver 220. The ability to publish status information may enable faults in the edge diagnostics system to be identified promptly and facilitate debugging should a bug occur in the edge diagnostics system. For example, diagnostic driver 220 may publish a diagnostic fault in response to a fault detected one or more of: the aggregated payloads, the aggregator, or one of the plurality of monitors. Diagnostic driver 220 may publish a diagnostic fault if a status counter incremented since a last observed UDP packet. Diagnostic driver 220 may publish a diagnostic fault if a monitor in monitors 210 is not updated within a timeout. Diagnostic driver 220 may publish a diagnostic fault if a UDP packet has not been received within a timeout.

Compute system may include watchdog 230. Watchdog 230 may be one of the subscribers to topics 240. Based on the information in topics 240, watchdog 230 may determine whether the AV is in a degraded state or should enter a degraded state. Watchdog 230 may review conditions defined in a manifest to determine whether the information reported in topics 240 meets a condition that would trigger the AV to enter a specific degraded state. A condition may require a certain maturation duration of the information in order for the condition to be met. A condition may expire after a certain period of time. The AV may trigger an AV stack to execute specific safety measures in response to the AV entering a specific degraded state, e.g., such as pulling over and coming to a stop gracefully, entering a minimal risk condition, calling a remote assistance platform, etc.

FIG. 3 illustrates an exemplary standalone monitor 302 implemented on an edge device 130, according to some aspects of the disclosed technology. A standalone monitor 302 may periodically query and check data about the edge device 130 and can report the data or a derivation of the data as payloads. Examples of standalone monitors may be processing unit voltage and temperature monitors. A standalone monitor 302 may be a periodic out-of-band monitor, where the data being monitored serves a primary purpose of querying the data and checking if there are any faults. Standalone monitor 302 may include monitor library API 310, periodic monitor 350, and optionally initialization and registration 360. Initialization and registration 360 may set a rate/frequency at which the standalone monitor 302 reports edge device health status (e.g., $f$ Hz). Initialization and registration 360 may cause the monitor library API 310 to output payloads at the rate/frequency. Monitor library API 310 may implement a periodic callback function to trigger periodic monitor 350 to query edge device health status and generate a payload having the edge device health status. The periodic monitor 350 may provide the payload to monitor library API 310, and monitor library API 310 may transmit the payload via inter-process communication to aggregator 206.

Figure 4:
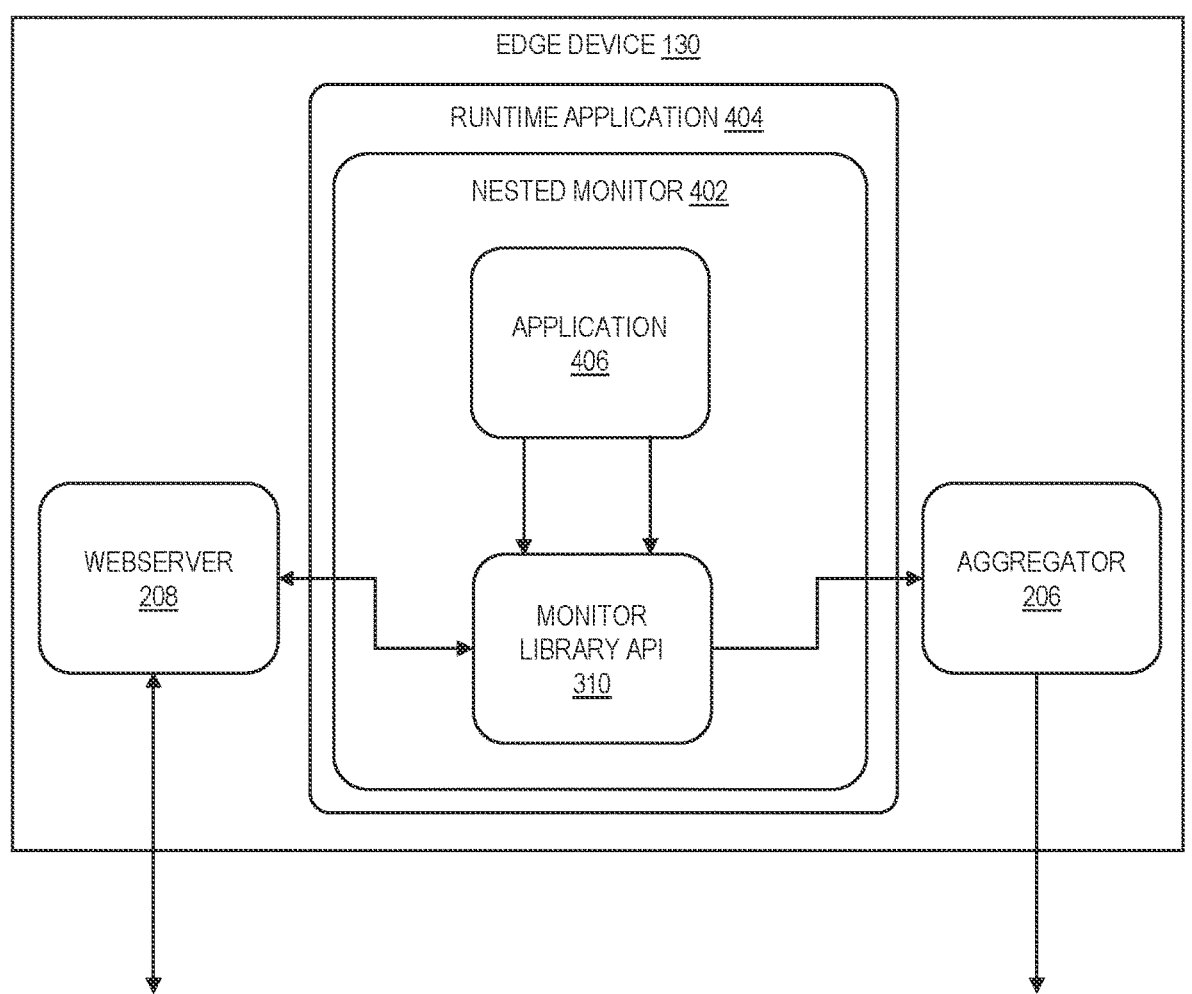
FIG. 4 illustrates an exemplary nested monitor implemented on an edge device, according to some aspects of the disclosed technology.

FIG. 4 illustrates an exemplary nested monitor 402 implemented on an edge device 130, according to some aspects of the disclosed technology. A nested monitor 402 may be implemented within a software application (runtime application 404) on the edge device 130. The software application may query and check data about the edge device. Nested monitor 402 may obtain the data from the software application and can periodically report the data or a derivation of the data as payloads. An example of a nested monitor 402 is a fan-speed monitor for a fan controller, where the fan controller is an example of runtime application 404. A nested monitor 402 may be a (periodic) nested out-of-band monitor, where the data being monitored serves a primary purpose in the software application (e.g., fan-speed control). A nested monitor 402 may not have existing in-band communication and may be nested into the software application that is already querying and checking the data. Nested monitor 402 may include monitor library API 310 and application 406. Application 406 may periodically obtain edge device health status from runtime application 404 (or cause runtime application 404 to publish the edge device health status information periodically to application 406) and generate a payload having the edge device health status. Application 406 may provide the payload to monitor library API 310, monitor library API 310 may transmit the payload via inter-process communication to aggregator 206. Application 406 may set a rate/frequency at which the nested monitor 402 reports edge device health status (e.g., ƒ Hz). Application 406 may cause the monitor library API 310 to output payloads at the rate/frequency.

Both standalone monitor 302 of FIG. 3 and nested monitor 402 of FIG. 4 include a monitor library API 310. Implementing a monitor library API 310 can provide added benefits to be able to obtain information about a monitor. In some cases, the monitor library API 310 can allow for fault injection, which can be beneficial for testing whether the edge devices diagnostics system is working properly or as intended. Monitor library API may allow requestors to request configuration of a monitor to be modified and/or be reset back to default values.

Monitor library API 310 can be standardized across different monitors, and standardization of monitor library API 310, i.e., specifying a set of functions being carried out by monitor library API 310, can simplify authoring of monitors. Monitor library API 310 may include monitor initialization, which can include initializing the monitor with an underlying monitor publishing framework. Monitor library API 310 may include monitor configuration, which can include support for loading configuration data files (e.g., data file in human-readable data serialization language) having monitor configuration information from a standard location at build time. Monitor library API 310 may include payload publishing, which can include an API to publish payloads to aggregator 206. Monitor library API 310 for standalone monitors may include periodic monitor call back registration, which can include a callback mechanism to execute or trigger a periodic monitor at a rate/frequency of the monitor and to fill out a payload.

Monitor library API 310 may receive requests and generate responses about the monitor. For example, monitor library API 310 may receive requests from or via requestors such as webserver 208. Monitor library API 310 may report the existence of the monitor to a requestor, such as webserver 208. Monitor library API 310 may report configuration information of the monitor to a requestor, such as webserver 208. Monitor library API 310 may enable monitor testing and/or discovery.

In some cases, it may be desirable to modify the configuration of the monitor. Monitor library API 310 may accept a request to update the configuration information of the monitor based on an update specified in the request. Monitor library API 310 may modify the configuration information of the monitor and caused the updated configuration information to be used. Monitor library API 310 may accept a request to reset the configuration information of the monitor to a default configuration information. Monitor library API 310 may overwrite the configuration information based on default configuration information of the monitor. Modifying the configuration of the monitor may change the behavior of the monitor and/or the health status information that the monitor reports. Modifying the configuration of the monitor may enable on-the-fly or dynamic adjustment of the monitor's behavior based on certain conditions occurring in the AV. Modifying the configuration of the monitor may enable testing of the edge devices diagnostics system by seeing how the edge devices diagnostics system would behave in response to certain changes in the configuration of the monitor. For example, configuration of a monitor may be updated using the monitor library API 310 to adjust the threshold(s) being used in the monitor. Configuration of a monitor may be updated using the monitor library API 310 to change (increase or decrease) a severity associated with status flags being reported by a monitor. Configuration of a monitor may be updated using the monitor library API 310 to change a timeout (e.g., time period associated with the timeout).

In some cases, it may be desirable to inject (artificial) faults into the monitor, in order to emulate one or more faults occurring in the edge devices diagnostics system (without the faults actually happening in the system). Fault injection may enable testing of the edge devices diagnostics system by seeing how the edge devices diagnostics system would behave in the presence of one or more faults. Monitor library API 310 may accept a request to replace values of a payload output by the first monitor with values specified in the request. For example, Monitor library API 310 may inject the specified values in a payload and transmit the augmented payload to aggregator 206 having the specified values. The specified values may cause certain expected behaviors to occur downstream within the edge devices diagnostics system, and fault injection using the specified values at the monitor can test whether the expected behaviors would indeed occur. In some cases, monitor library API 310 may accept a request to reset an error/fault/occurrence counter. Monitor library API 310 may reset the counter to zero or some other specified value, if applicable.

Webserver 208 may have access to and/or communicate with monitor library API 310 of monitors on an edge device. The webserver 208 may be a proxy to the monitors, especially if querying or submitting requests to monitors is not as straightforward as querying or submitting requests to webserver 208. In some cases, webserver 208 may receive a query targeted to a first monitor of the monitors. In response to the query, webserver 208 may query the first monitor via an application programming interface of the first monitor (e.g., monitor library API 310). In some cases, webserver 208 can receive a request to change configuration information of a first monitor of the monitors. In response to the request, webserver 208 may request a change to the configuration information of the first monitor via an application programming interface of the first monitor (e.g., monitor library API 310). In some cases, webserver 208 can receive a request to inject a fault in a first monitor of the monitors. In response to the request, the webserver 208 can requests the fault to be injected in first monitor via an application programming interface of the first monitor (e.g., monitor library API 310).

Figure 5:
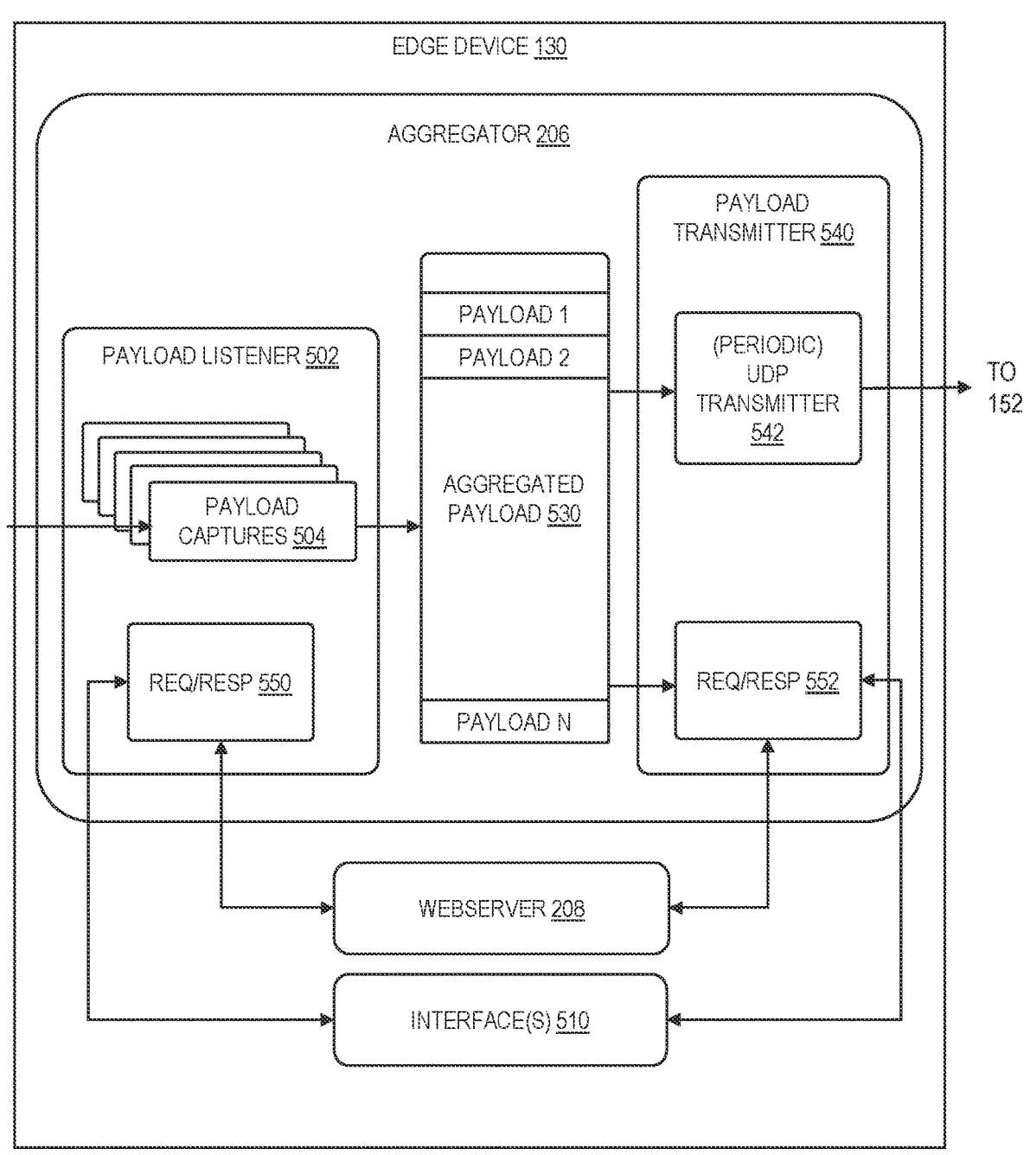
FIG. 5 illustrates an exemplary aggregator implemented on an edge device, according to some aspects of the disclosed technology.

FIG. 5 illustrates an exemplary aggregator 206 implemented on an edge device 130, according to some aspects of the disclosed technology. Aggregator 206 may include payload listener 502 and payload transmitter 540. Edge device 130 may have a plurality of monitors outputting/publishing payloads as described with FIGS. 2-4. Aggregator 206 may subscribe to monitors implemented on edge device 130. In some cases, aggregator 206 may publish aggregated payloads to, e.g., a diagnostics driver of a compute system of an AV. Aggregator 206 may aggregate information (e.g., payloads) across all the monitors on the edge device. Aggregated payloads may be transmitted as a UDP multicast payload to recipients, preferably periodically or at a certain frequency/cadence.

Payload listener 502 can capture payloads generated by monitors implemented on the edge device 130 and store them as payload captures 504 (e.g., in a payload capture buffer). For example, payload listener 502 can capture at least the first payloads from a first monitor implemented on edge device 130 and second payloads from a second monitor implemented on edge device 130. The aggregator 206, e.g., payload listener 502, can receive the first payloads and the second payloads over an inter-process communication channel. Payload listener 502 may capture other payloads from other monitors implemented on edge device 130 and store them as payload captures 504. Payload listener 502 can form aggregated payloads based on contents in payload captures 504. Payload listener 502 may flush the payloads stored as payload captures 504 in a payload captures buffer at a certain frequency or cadence to form aggregated payloads. Payloads captured and stored as payload captures 504 in payload captures buffer during an aggregator period may be collected as one aggregated payload. An exemplary aggregated payload 530 having multiple payloads captured during an aggregator period is shown in FIG. 5. Aggregated payloads aggregated in this manner may have the first payloads from the first monitor and second payloads from the second monitor.

Aggregator 206 may include a payload transmitter 540 to transmit UDP packets having the aggregated payloads over a network (e.g., network 152) to a diagnostics driver (e.g., diagnostics driver 220 on FIG. 2) on a compute system of the AV. Payload transmitter 540 may include (periodic) UDP transmitter 542. UDP transmitter 542 may, at a certain frequency or cadence, take an aggregated payload, and package the aggregated payload as a UDP payload and transmit the UDP payload as a UDP (multicast) packet over network 152. Details regarding the aggregation of payloads and transmitting of aggregated payloads are described with FIG. 6.

In some cases, UDP transmitter 542 takes the aggregated payloads, e.g., aggregated payload 530 as structured or parsable data and transmit UDP packets having the structured data and/or data in a parsable format. In some cases, aggregator 206, e.g., payload transmitter 540, may include a converter to convert the aggregated payloads from structured data (e.g., in structured/parsable format) to blobs. Blobs are file-like objects having immutable, raw data (that may include text or binary data). Blobs may be preferable for due to efficient wire usage, and potentially simpler processing by the diagnostics driver in the compute system of the AV. Blobs can be streamed and transmitted more easily than structured data. The converter can take structured data (e.g., data in a markup language, data in JavaScript Object Notation (JSON) format) in an aggregated payload and create a blob. The UDP transmitter 542 may transmit one or more UDP packets having the blob (as opposed to structured data).

Aggregator 206, e.g., payload listener 502 and/or payload transmitter 540, may cache latest payload received per monitor in edge device 130. Aggregator 206, e.g., payload transmitter 540 and/or payload transmitter 540, may cache latest payload received per monitor in edge device 130 and/or latest aggregated payload in the last aggregator period. Caching latest payloads and latest aggregated payload may provide information relating to a status or state of the aggregator 206. In some cases, aggregator 206 may include one or more APIs that allows reporting of status or state of the aggregator 206. As illustrated, aggregator 206 may include one or more request and response interfaces or APIs, e.g., req/resp 550 and req/resp 552. Req/resp 550 may be implemented in payload listener 502. Req/resp 552 may be implemented in payload transmitter 540. Requestors of status or state information of the aggregator 206 may submit requests to req/resp 550 and/or req/resp 552 via webserver 208 and/or interface(s) 510. Webserver 208 and interface(s) 510 may be requestors of status or state information of the aggregator 206. Req/resp 550 and req/resp 552 may be used to publish information to consumers of information about the aggregator 206 (e.g., consumers may include requestors implemented on the edge device 130). The information may be published by req/resp 550 and/or req/resp 552 as JSON blobs. Webserver 208 may include a REST API. Interface(s) 510 may include a command line tool (e.g., for on-device debugging).

Req/resp 550 and/or req/resp 552 may not be available (or disabled) during runtime of the AV. Req/resp 550 and/or req/resp 552 may be available (or enabled) for, e.g., debugging, manufacturing, and/or one-time checks at launch time of the AV. Req/resp 550 and/or req/resp 552 may be available (or enabled) for fault injection purposes.

In some embodiments, req/resp 550 and/or req/resp 552 may receive a request from a requestor and may return a last aggregated payload that is cached and sent by the payload transmitter 540. For example, the webserver 208 may receive a request to report a cached aggregated payload in the aggregator 206. In response to the request, the webserver may request the cached aggregated payload from the aggregator 206 via an API of the aggregator 206 (such as req/resp 552).

In some embodiments, req/resp 550 and/or req/resp 552 may receive a request, and to return a last first payload that is cached and received by the payload listener 502 from one of the monitors. For example, the webserver 208 may receive a request to report a cached payload received by the aggregator 206 from a first monitor of the monitors. In response to the request, the webserver 208 can request the cached payload from the aggregator 206 via an API of the aggregator 206 (such as req/resp 552).

In some embodiments, the APIs (e.g., req/resp 550 and/or req/resp 552) may allow fault injection in the aggregator 206, such as accepting and executing requests to artificially change payloads and/or behavior of the aggregator 206 for testing purposes. Req/resp 550 and/or req/resp 552 may receive a request for fault injection, and in response to the request, can inject the specified fault in aggregator 206. For example, the webserver 208 may receive a request to inject a fault in the aggregator 206. In response to the request, the webserver 208 can request the fault to be injected in the aggregator 206 via an application programming interface of the aggregator 206.

APIs of aggregator 206 (e.g., req/resp 550 and/or req/resp 552) may trigger different kinds of artificial faults to be injected or reported in aggregator 206. APIs of aggregator 206 (e.g., req/resp 550 and/or req/resp 552) may trigger changes to the behavior of the aggregator 206. The faults can be requested via webserver 208 and/or interface(s) 510. In some embodiments, the aggregator 206 can include an API to receive a request to corrupt data in a UDP packet being transmitted by the payload transmitter 540. For instance, the data being corrupted can include a cyclic redundancy check code. In response to the request, the aggregator 206 may trigger data to be corrupted in the UDP packet. In some embodiments, the aggregator 206 may include an API to receive a request to drop a received payload from one of the monitors in an aggregated payload (e.g., aggregated payload 530). In response to the request, aggregator 206 may cause a specific payload to be dropped/omitted in the aggregated payload. In some embodiments, aggregator 206 may include an API to receive a request to change a timestamp of a received payload from one of the monitors in an aggregated payload (e.g., aggregated payload 530). In response to the request, aggregator 206 may cause a timestamp in a received payload to be modified. In some embodiments, the aggregator 206 may include an API to receive a request to change an output rate of the payload transmitter 540. In response to the request, aggregator 206 may cause the payload transmitter 540 to send UDP packets at a different output rate. In some embodiments, aggregator 206 may include an API to receive a request to report an erroneous amount of free disk space of the edge device 130. In response to the request, aggregator 206 may report the erroneous amount of free disk space. In some embodiments, the aggregator may include an application programming interface to receive a request to report a disk error. In response to the request, aggregator 206 may report the disk error. In some embodiments, aggregator 206 may include an API to receive a request to report a memory error. In response to the request, aggregator 206 may report the memory error. In some embodiments, aggregator 206 may include an API to receive a request to replace values of a first payload received by the payload listener from one of the monitors of the edge device 130 with values specified in the request. In response to the request, aggregator 206 may replace values of the first payload according to the request.

Figure 6:
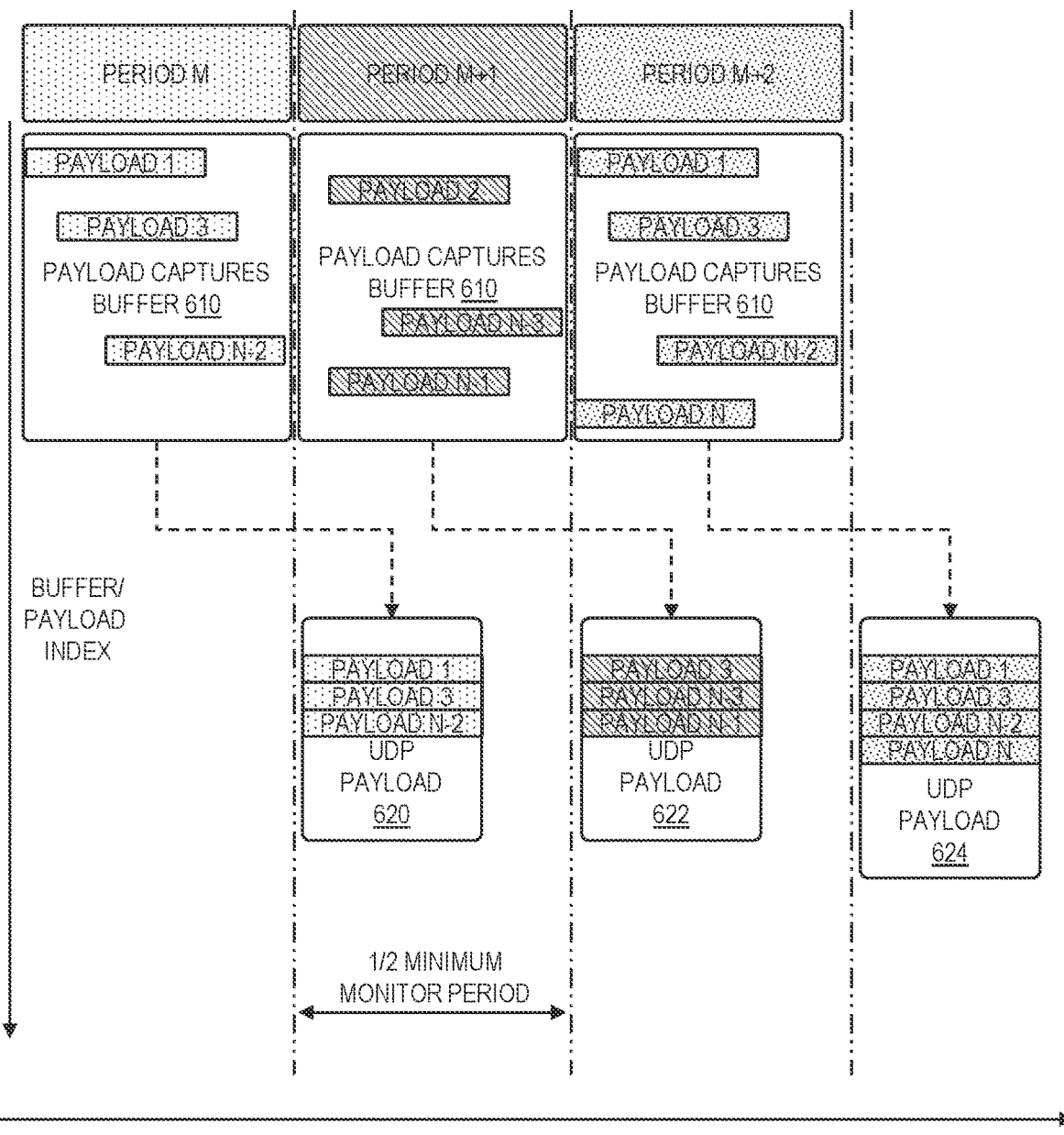
FIG. 6 illustrates timing and operations performed by an aggregator implemented on an edge device, according to some aspects of the disclosed technology.

Setting an Output Rate of the Aggregator Based on the Output Rates of the Monitors FIG. 6 illustrates timing and operations performed by an aggregator (e.g., aggregator 206 in FIGS. 2-5) implemented on an edge device, according to some aspects of the disclosed technology. The aggregator may operate at a certain output rate, e.g., to output packets at a certain frequency or cadence. As discussed previously with FIG. 5, payload listener 502 may listen for payloads from various monitors provisioned on the edge device, and capture the payloads in a payload captures buffer (shown as payload captures buffer 610 in FIG. 6) as payload captures 504. The illustrated figure shows a payload captures buffer 610 capturing payloads sent from the monitors of the edge device over three time periods, e.g., period M, period M+1, and period M+2. At the end or just after an aggregator time period (e.g., 1/output rate of the aggregator), the aggregator may flush or dump payloads in the payload captures buffer 610, aggregate the payloads, and transmit one or more UDP packets having the aggregated payloads of that time period.

In period M, payload captures buffer 610 captured and stored payload 1, payload 2, and payload N−2 from different monitors. After period M, the aggregator (e.g., UDP transmitter 542 of FIG. 5) may package the captured payloads, payload 1, payload 2, and payload N−2, into UDP payload 620 and transmit one or more UDP packets having the UDP payload 620 over the network (e.g., network 152 of FIGS. 1, 2, and 5).

In period M+1, payload captures buffer 610 captured and stored payload 2, payload N−3, and payload N−1 from different monitors. After period M+1, the aggregator (e.g., UDP transmitter 542 of FIG. 5) may package the captured payloads, payload 2, payload N−3, and payload N−1, into UDP payload 622 and transmit one or more UDP packets having the UDP payload 622 over the network (e.g., network 152 of FIGS. 1, 2, and 5).

In period M+2, payload captures buffer 610 captured and stored payload 1, payload 3, payload N−2, and payload N from different monitors. After period M+2, the aggregator (e.g., UDP transmitter 542 of FIG. 5) may package the captured payloads, payload 1, payload 3, payload N−2, and payload N, into UDP payload 624 and transmit one or more UDP packets having the UDP payload 624 over the network (e.g., network 152 of FIGS. 1, 2, and 5).

The monitors provisioned on the edge device may run asynchronously from the aggregator. In other words, the monitors may output payloads asynchronously. While the monitors may output payloads to the aggregator periodically, the receipt of the payloads at the aggregator (e.g., at the payload captures buffer 610) may be subject to scheduler jitter. If the aggregator runs a fastest output rate of the monitors, the following hazards may occur during a given aggregator period: (1) a monitor could publish 0 payloads (jitter causing it to publish just before the period and just after the period), and (2) a monitor could publish 2 payloads (jitter causing it publish at the start of the period and again at the end. Hazard (1) may cause one packet to be missing from a monitor payload entirely. Hazard (2) may mask two monitor updates into one in a packet. To avoid the hazards, the aggregator (e.g., UDP transmitter 542 of payload transmitter 540) can run at least at twice (2×) the fastest output rate of the monitors. The aggregator can transmit one or more UDP packets having any (and all) payloads captured by the payload listener during a period of the payload transmitter.

Branding for Different Edge Devices Simplifies Implementation of Edge Devices Diagnostics System It is not trivial to implement and standardize the components of the edge device diagnostics system. A build system can provide hooks for registering a monitor (e.g., a standalone monitor 302 of FIG. 3 or a nested monitor 402 of FIG. 4).

Configurations of monitors may be defined in various configuration data files corresponding to the different monitors (e.g., a file with configuration values in a human-readable data serialization language). Edge devices diagnostics software developers may utilize a template/schema to write the various configuration data files for different monitors of the edge device. In some cases, standard/default templates may be provided for monitors to define or set a basic/minimum set of health status information to be reported. A configuration data file may include or specify a name of the monitor, a rate the monitor reports at, data being monitored by the monitor, and measurement configuration for the monitor. The use of templates and configuration data files may simplify authoring and configuration monitors. The build system can generate software code for the monitors in accordance with the configuration information specified in the configuration data files. The build system can compile the software code to generate software artifacts for the various monitors.

The build system may also provide hooks to identify a enumerated set of monitors for a given edge device. The enumerated set of monitors for an edge device can be specified in a branded edge device diagnostics configuration file. The build system can provide hooks to identify branded edge device diagnostics configuration files. The branded edge device diagnostics configuration file can include a list of monitors to be registered for a given edge device (or a list of monitors to be built by the build system). The branded edge device diagnostics configuration file can include static configuration information for each monitor. The branded edge device diagnostics configuration file may include dynamic configuration information (e.g., configuration information that is to be determined at launch time or runtime of the AV). Configuration information for various monitors may include network configuration information (e.g., information that identifies network addresses of various monitors). Configuration information for various monitors may include specifying one or more functions to be implemented in a monitor library API (e.g., functionalities relating to fault injection). In some cases, standard/default templates may be provided as a starting point for authoring a branded edge device diagnostics configuration file, e.g., to define or set a basic/minimum set of monitors to be registered and the configuration information for the monitors. Using the branded edge device diagnostics configuration file, the build system can generate software code (e.g., for the aggregator), build software artifacts (e.g., for the aggregator), and consolidate software artifacts generated for the enumerated set of monitors into a build system artifact. Use of branded edge device diagnostics configuration files may simplify/standardize enumeration of monitors for edge devices of the same type (e.g., for four red-green-blue cameras), making implementation of the edge device diagnostics system easier.

FIGS. 7A-B illustrate exemplary branded edge device diagnostics configuration files, according to some aspects of the disclosed technology.

In FIG. 7A, a first exemplary branded edge device diagnostics configuration file is shown. The configuration file includes a name of the brand or branding, "BrandingA". The configuration file may further include an enumeration or a list of monitors to be registered for the brand. In this example, the enumeration of monitors includes monitor_1 and monitor_2. For each monitor, static configuration information/values may be provided in the first branded edge device diagnostics configuration file. The first branded edge device diagnostics configuration file can include a list of the one or more monitors, and one or more static Internet Protocol (IP) addresses corresponding to the one or more monitors. In this example, monitor_1 may have a static IP address (ip_address: "192.168.1.2"), and monitor_2 may have a different static IP address (ip_address: "10.1.1.51").

In FIG. 7B, a second exemplary branded edge device diagnostics configuration file is shown. The configuration template includes a name of the brand or branding, "BrandingB". The configuration template may further include an enumeration or a list of monitors to be registered for the brand. In this example, the enumeration of monitors includes monitor_3 and monitor_4. For each monitor, static configuration information/values and/or dynamic configuration information/values may be provided in the second branded edge device diagnostics configuration file. The second branded edge device diagnostics configuration file can include a list of the one or more monitors, and one or more dynamic peer IP addresses corresponding to the one or more monitors. In this example, monitor_3 may have a static IP address (ip_address: "192.168.1.2"), and monitor_4 may have a different static IP address (ip_address: "10.1.1.51"). In some cases, dynamic configuration information/values may be specified for one or more monitors in the second branded edge device diagnostics configuration file. In this example, monitor_3 may have a dynamic peer IP address (peer_ip: "dynamic_params.peer_ip"), which may point to a variable that is defined/set at launch time or runtime of the AV. Monitor_4 may have a static peer IP address (peer_ip: "10.1.1.52").

In some cases, the build system may run build time checks to prevent build system artifacts that have unregistered/unspecified monitors from being deployed onto AVs. The checks can be performed based on various branded edge device diagnostics configuration files identified by the build system.

In some cases, the branded edge device diagnostics configuration file may prescribe a dynamic number of monitors to be registered for an edge device. In some cases, the branded edge device diagnostics configuration file may prescribe a required number or set of monitors to be registered an edge device. The need to include some monitors on an edge device may not be determinable until launch time. A branded edge device diagnostics configuration file may include a list of one or more monitors (all of the monitors are to be included in the build system artifact), and a subset of the one or more monitors may be conditionally run at runtime (or registered at launch time). A branded edge device diagnostics configuration file may include a list of one or more monitors (all of the monitors are to be included in the build system artifact), and a subset of the one or more monitors may be required run at runtime (or registered at launch time).

An exemplary method for building and deploying the software artifacts for edge devices diagnostics in a networked computing system for an AV is described with FIG. 12.

At runtime, the compute system can launch diagnostics drivers for various edge devices and gathers information from the various edge devices about the health status information being monitored to compile a watchdog configuration file. The compute system may determine whether edge devices on the AV is utilizing a certain brand. Based on the brand/branding, the compute system can determine the monitors being registered for the edge device. The compute system may also determine configuration information corresponding to the monitors, such as the health status information being monitored, the rate at which the health status information is being monitored, and monitor configuration information (e.g., thresholds, and timeouts). In some cases, compute system query the webserver of an edge device (e.g., webserver 208 of FIGS. 2-5) to obtain the information about the monitors running on various edge devices. In some cases, the edge devices may at launch time publish the information about the monitors to the compute system. Using the watchdog configuration file, the watchdog (watchdog 230 of FIG. 2) is aware of what types of health status information is expected and can trigger degraded states of the AV accordingly. The watchdog can use the manifest file to determine which faults to expect and determine when to trigger the AV to enter a degraded state of operation.

Figure 8:
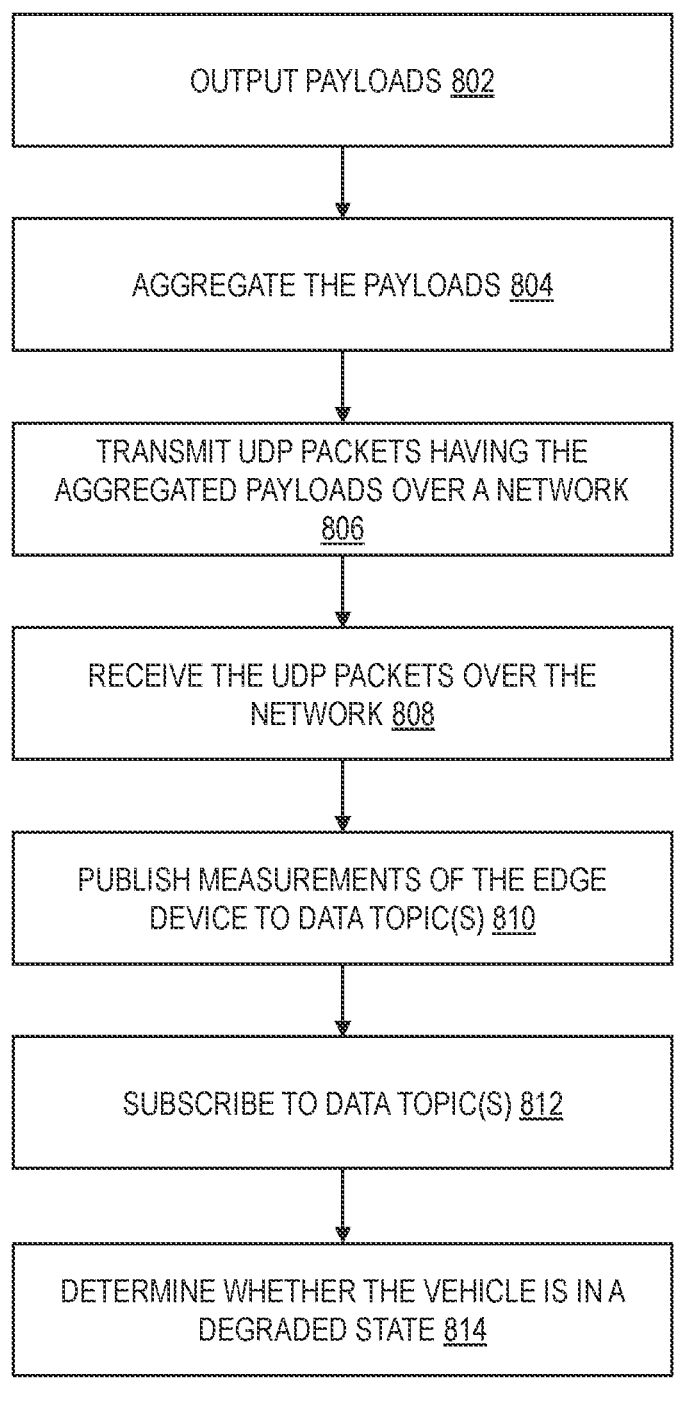
FIG. 8 is a flow diagram illustrating an exemplary method for collecting health status information in a networked computing system for an AV, according to some aspects of the disclosed technology.

Exemplary Computing Methods for Edge Diagnostics Reporting in a Networked Computing System of a Vehicle FIG. 8 is a flow diagram illustrating an exemplary method for collecting health status information in a networked computing system for an AV, according to some aspects of the disclosed technology. The method may be implemented on systems such as the one illustrated in FIGS. 1-5 and 13-14. In 802, a plurality of monitors of the edge device of the AV may output payloads. The payloads can include edge device health status. In 804, an aggregator of the edge device may aggregate the payloads from the plurality of monitors. In 806, the aggregator may transmit UDP packets having the aggregated payloads over a network. In 808, a diagnostics drive on a compute system of the AV may receive the UDP packets having the aggregated payloads over the network. In 810, the diagnostics driver may publish measurements of the edge device based on the received packets to one or more data topics corresponding to measurements of the edge device. In 812, a watchdog on the compute system may subscribe to the one or more data topics. In 814, the watchdog may determine from the one or more data topics whether the vehicle is in a degraded state.

Figure 9:
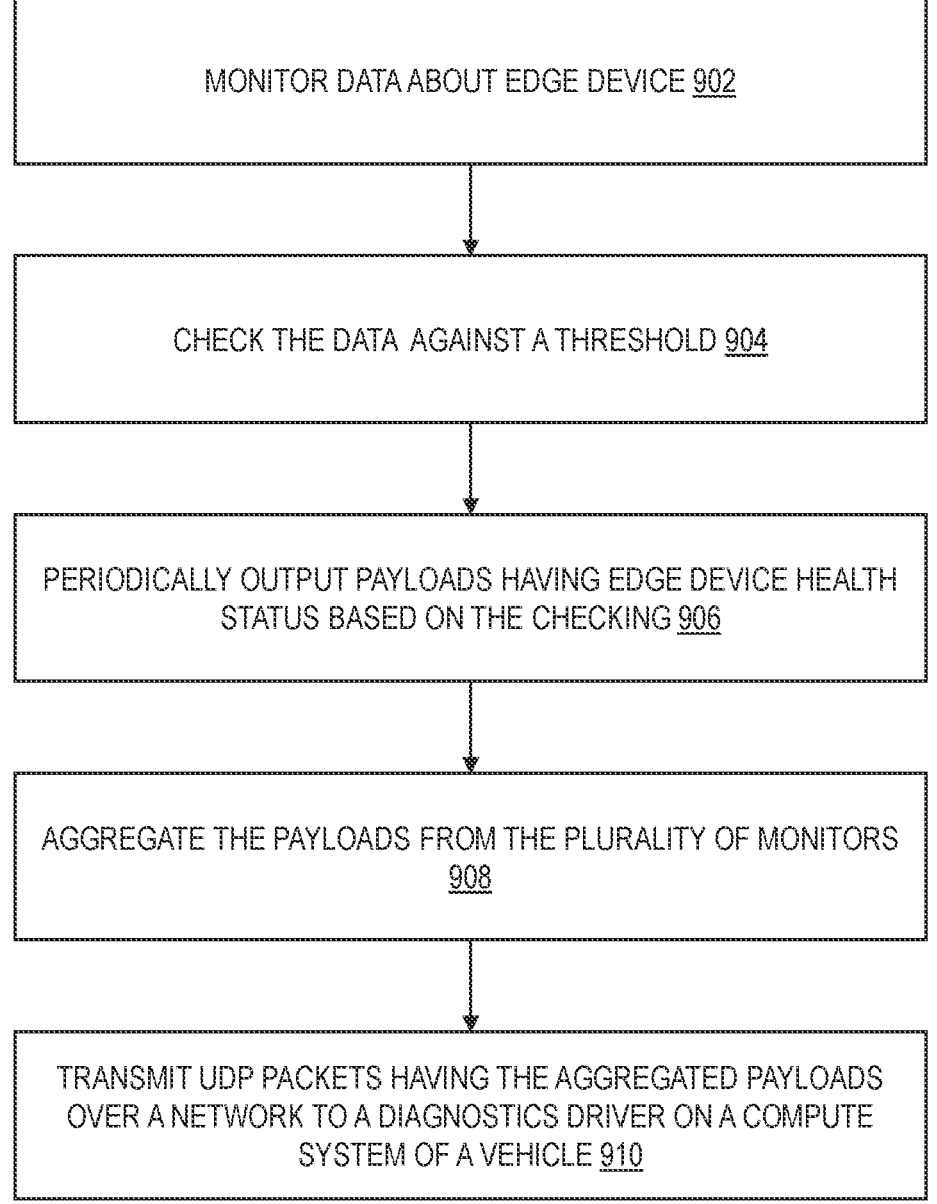
FIG. 9 is a flow diagram illustrating an exemplary method for providing health status information from an edge device to a compute system of an AV, according to some aspects of the disclosed technology.

FIG. 9 is a flow diagram illustrating an exemplary method for providing health status information from an edge device to a compute system of an AV, according to some aspects of the disclosed technology. The method may be implemented on systems such as the one illustrated in FIGS. 1-5 and 13-14. In 902, a first monitor in a plurality of monitors on the edge device of the AV may monitor data about the edge device. In 904, the first monitor may check the data against a threshold. The threshold may be defined in configuration information corresponding to the first monitor. The first monitor may generate edge device health status. In 906, the first monitor may periodically output payloads having edge device health status based on the checking. In 908, an aggregator on the edge device may aggregate the payloads from the plurality of monitors. In 910, the aggregator may transmit UDP packets having the aggregated payloads over a network to a diagnostics driver on a compute system of the vehicle.

Figure 10:
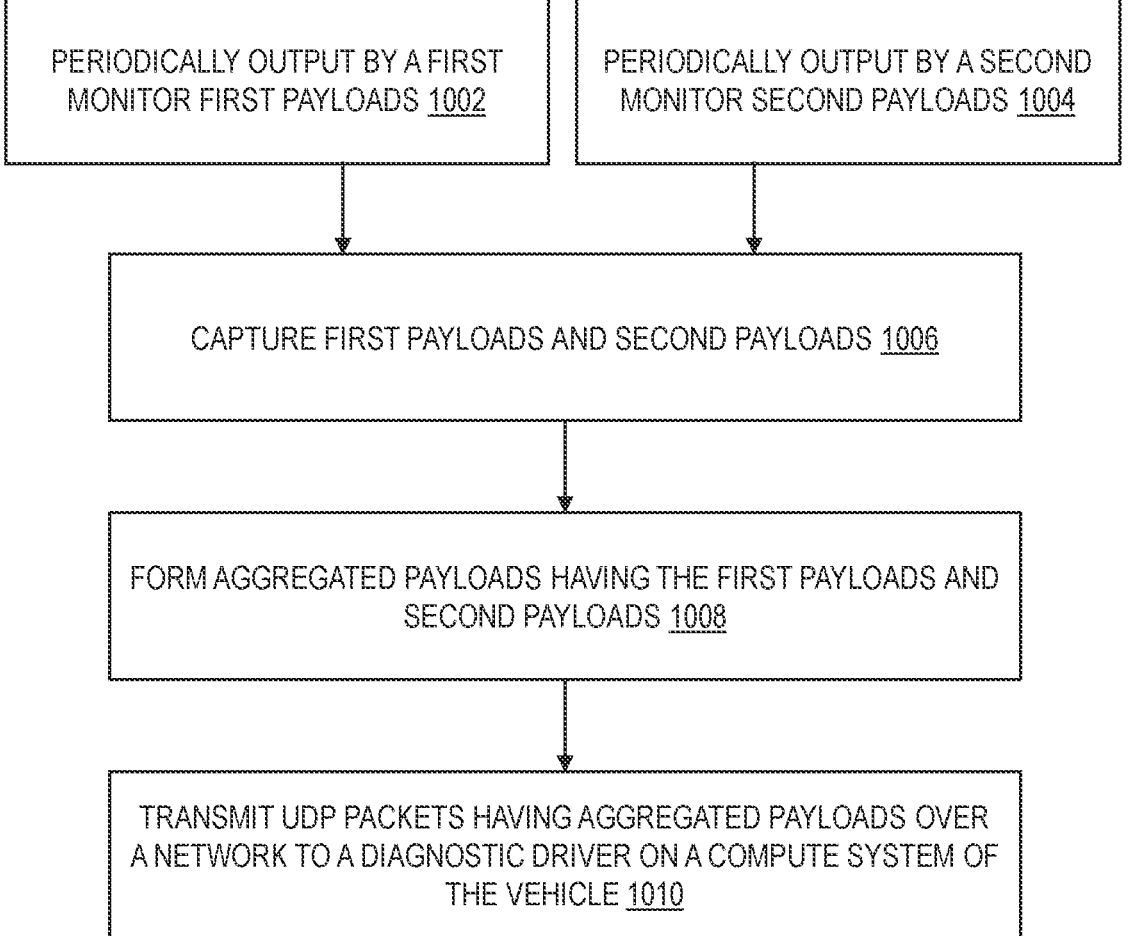
FIG. 10 is a flow diagram illustrating another exemplary method for providing health status information from an edge device to a compute system of an AV, according to some aspects of the disclosed technology.

FIG. 10 is a flow diagram illustrating another exemplary method for providing health status information from an edge device to a compute system of an AV, according to some aspects of the disclosed technology. The method may be implemented on systems such as the one illustrated in FIGS. 1-5 and 13-14. In 1002, a first monitor of the edge device of the vehicle may periodically output first payloads having first edge device health status. In 1004, a second monitor of the edge device may periodically output second payloads having second edge device health status. In 1006, a payload listener of an aggregator of the edge device may capture at least the first payloads and second payloads from the plurality of monitors. In 1008, the payload listener may form aggregated payloads having the first payloads and second payloads. In 1010, a payload transmitter of the aggregator may transmit UDP having the aggregated payloads over a network to a diagnostics driver on a compute system of the vehicle.

Figure 11:
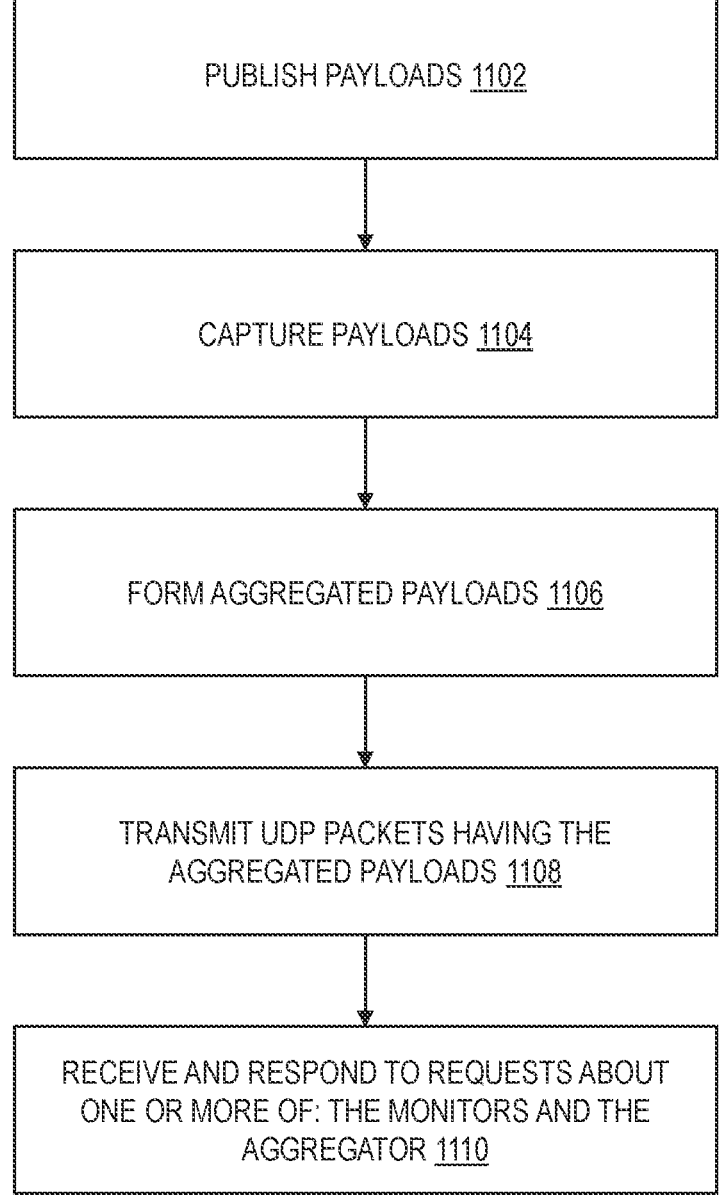
FIG. 11 is a flow diagram illustrating an exemplary method for managing monitors in an edge devices diagnostics system of an AV, according to some aspects of the disclosed technology.

FIG. 11 is a flow diagram illustrating an exemplary method for managing monitors in an edge devices diagnostics system of an AV, according to some aspects of the disclosed technology. The method may be implemented on systems such as the one illustrated in FIGS. 1-5 and 13-14. In 1102, the monitors of the edge device of the vehicle may publish payloads having edge device health status. In 1004, an aggregator of the edge device may capture the payloads from the plurality of monitors. In 1006, the aggregator may form aggregated payloads having the payloads. In 1008, the aggregator may transmit UDP packets having the aggregated payloads over a network to a diagnostics driver on a compute system of a vehicle. In 1110, a webserver of the edge device may receive and respond to requests about one or more of: the monitors and the aggregator.

Exemplary Method for Building and Deploying Software Artifacts Onto an AV

FIG. 12 is a flow diagram illustrating an exemplary method for building and deploying software artifacts for edge devices diagnostics for AVs, according to some aspects of the disclosed technology. The method may be implemented within the system illustrated in FIG. 13 (e.g., using device software management platform 1380). In 1202, an indication that a first edge device is to use a first branded edge device diagnostics configuration file is received. In 1204, the first branded edge device diagnostics configuration file may be retrieved. The first branded edge device diagnostics configuration file can specify one or more monitors and corresponding network configuration of the one or more monitors (e.g., see FIGS. 7A-B). In 1206, a first configuration data file corresponding to a first monitor in the one or more monitors can be retrieved. The first configuration data file may include a name of the first monitor, a rate the first monitor reports at, data being monitored by the first monitor, and measurement configuration for the first monitor. In 1208, software code may be triggered to be generated for the one or more monitors and an aggregator based on at least the first branded edge device diagnostics configuration file and the first configuration data file. In 1210, software artifacts may be generated for the one or more monitors and an aggregator for the first edge device based on the software code. In 1202, the software artifacts may be transmitted and deployed onto the first edge device on the vehicle. The software artifacts, when deployed onto the first edge device on the vehicle, can cause edge device health status to be reported from the first edge device over a network to a compute system of the vehicle.

In some embodiments, the software artifacts comprise a first software artifact for the first monitor. The first software artifact, when executed on the first edge device, can cause the first monitor to produce payloads reporting health status of the first edge device according to the first configuration data file.

In some embodiments, the software artifacts comprise a second software artifact for the aggregator. The second software artifact, when executed on the first edge device, can cause the aggregator to aggregate payloads received from the one or more monitors and transmit aggregated payloads according to the branded edge device diagnostics configuration file.

Exemplary AV Management System

Figure 13:
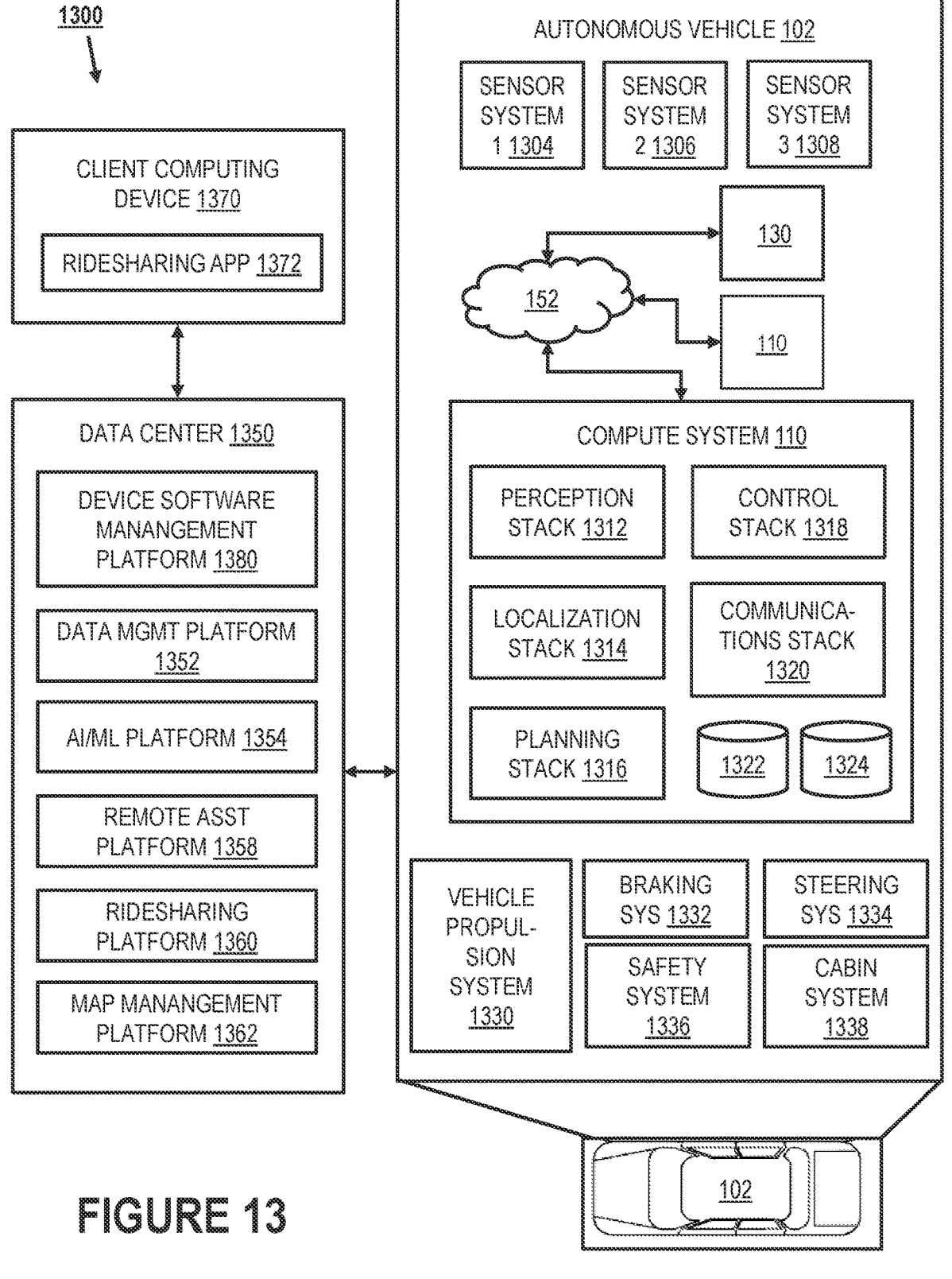
FIG. 13 illustrates an exemplary system environment that may be used to facilitate AV operations, according to some aspects of the disclosed technology.

Turning now to FIG. 13, this figure illustrates an example of an AV management system 1300, in which some of the aspects of the present disclosure can be implemented. One of ordinary skill in the art will understand that, for the AV management system 1300 and any system discussed in the present disclosure, there may be additional or fewer components in similar or alternative configurations. The illustrations and examples provided in the present disclosure are for conciseness and clarity. Other embodiments may include different numbers and/or types of elements, but one of ordinary skill the art will appreciate that such variations do not depart from the scope of the present disclosure.

In this example, the AV management system 1300 includes an AV 102, a data center 1350, and a client computing device 1370. The AV 102, and the data center 1350 may communicate with one another over one or more networks (not shown), such as a public network (e.g., the Internet, an Infrastructure as a Service (IaaS) network, a Platform as a Service (PaaS) network, a Software as a Service (SaaS) network, another Cloud Service Provider (CSP) network, etc.), a private network (e.g., a Local Area Network (LAN), a private cloud, a Virtual Private Network (VPN), etc.), and/or a hybrid network (e.g., a multi-cloud or hybrid cloud network, etc.).

AV 102 may navigate about roadways without a human driver based on sensor signals generated by multiple sensor systems 1304, 1306, and 1308. The sensor systems 1304-1308 may be considered edge devices 130 of the AV 102.

The sensor systems 1304-1308 may include different types of sensors and may be arranged about the AV 102. For instance, the sensor systems 1304-1308 may comprise Inertial Measurement Units (IMUs), cameras (e.g., still image cameras, video cameras, etc.), light sensors (e.g., LIDAR systems, ambient light sensors, infrared sensors, etc.), RADAR systems, a Global Navigation Satellite System (GNSS) receiver, (e.g., Global Positioning System (GPS) receivers), audio sensors (e.g., microphones, Sound Navigation and Ranging (SONAR) systems, ultrasonic sensors, etc.), engine sensors, speedometers, tachometers, odometers, altimeters, tilt sensors, impact sensors, airbag sensors, seat occupancy sensors, open/closed door sensors, tire pressure sensors, rain sensors, and so forth. For example, the sensor system 1304 may be a camera system, the sensor system 1306 may be a LIDAR system, and the sensor system 1308 may be a RADAR system. Other embodiments may include any other number and type of sensors.

AV 102 may also include several mechanical systems that may be used to maneuver or operate AV 102. The mechanical systems can be considered edge devices 130 of the AV 102. For instance, mechanical systems may include vehicle propulsion system 1330, braking system 1332, steering system 1334, safety system 1336, and cabin system 1338, among other systems. Vehicle propulsion system 1330 may include an electric motor, an internal combustion engine, or both. The braking system 1332 may include an engine brake, a wheel braking system (e.g., a disc braking system that utilizes brake pads), hydraulics, actuators, and/or any other suitable componentry configured to assist in decelerating AV 102. The steering system 1334 may include suitable componentry configured to control the direction of movement of the AV 102 during navigation. Safety system 1336 may include lights and signal indicators, a parking brake, airbags, and so forth. The cabin system 1338 may include cabin temperature control systems, in-cabin entertainment systems, and so forth. In some embodiments, the AV 102 may not include human driver actuators (e.g., steering wheel, handbrake, foot brake pedal, foot accelerator pedal, turn signal lever, window wipers, etc.) for controlling the AV 102. Instead, the cabin system 1338 may include one or more client interfaces (e.g., GUIs, Voice User Interfaces (VUIs), etc.) for controlling certain aspects of the mechanical systems 1330-1338.

AV 102 may include compute system 110 that is in communication with the sensor systems 1304-1308, the mechanical systems 1330-1338, the data center 1350, and the client computing device 1370, among other systems. The compute system 110 may include one or more processors and memory, including instructions that may be executed by the one or more processors. The instructions may make up one or more software stacks or components responsible for controlling the AV 102; communicating with the data center 1350, the client computing device 1370, and other systems; receiving inputs from riders, passengers, and other entities within the AV's environment; logging metrics collected by the sensor systems 1304-1308; and so forth. In this example, the compute system 110 includes a perception stack 1312, a mapping and localization stack 1314, a planning stack 1316, a control stack 1318, a communications stack 1320, an HD geospatial database 1322, and an AV operational database 1324, among other stacks and systems. Additional details relating to compute system 110 are illustrated in in FIGS. 1-6.

AV 102 may include network 152, and one or more edge devices 130. AV 102 may include one or more loggers 110. These components are illustrated in FIGS. 1-6.

Perception stack 1312 may enable the AV 102 to "see" (e.g., via cameras, LIDAR sensors, infrared sensors, etc.), "hear" (e.g., via microphones, ultrasonic sensors, RADAR, etc.), and "feel" (e.g., pressure sensors, force sensors, impact sensors, etc.) its environment using information from the sensor systems 1304-1308, the mapping and localization stack 1314, the HD geospatial database 1322, other components of the AV, and other data sources (e.g., the data center 1350, the client computing device 1370, third-party data sources, etc.). Perception stack 1312 may detect and classify objects and determine their current and predicted locations, speeds, directions, and the like. In addition, the perception stack 1312 may determine the free space around the AV 102 (e.g., to maintain a safe distance from other objects, change lanes, park the AV, etc.). Perception stack 1312 may also identify environmental uncertainties, such as where to look for moving objects, flag areas that may be obscured or blocked from view, and so forth.

Mapping and localization stack 1314 may determine the AV's position and orientation (pose) using different methods from multiple systems (e.g., GPS, IMUs, cameras, LIDAR, RADAR, ultrasonic sensors, the HD geospatial database 1322, etc.). For example, in some embodiments, the AV 102 may compare sensor data captured in real-time by the sensor systems 1304-1308 to data in the HD geospatial database 1322 to determine its precise (e.g., accurate to the order of a few centimeters or less) position and orientation. The AV 102 may focus its search based on sensor data from one or more first sensor systems (e.g., GPS) by matching sensor data from one or more second sensor systems (e.g., LIDAR). If the mapping and localization information from one system is unavailable, the AV 102 may use mapping and localization information from a redundant system and/or from remote data sources.

Planning stack 1316 may determine how to maneuver or operate the AV 102 safely and efficiently in its environment. For example, the planning stack 1316 may receive the location, speed, and direction of the AV 102, geospatial data, data regarding objects sharing the road with the AV 102 (e.g., pedestrians, bicycles, vehicles, ambulances, buses, cable cars, trains, traffic lights, lanes, road markings, etc.) or certain events occurring during a trip (e.g., an Emergency Vehicle (EMV) blaring a siren, intersections, occluded areas, street closures for construction or street repairs, DPVs, etc.), user input, and other relevant data for directing the AV 102 from one point to another. The planning stack 1316 may determine multiple sets of one or more mechanical operations that the AV 102 may perform (e.g., go straight at a specified speed or rate of acceleration, including maintaining the same speed or decelerating; turn on the left blinker, decelerate if the AV is above a threshold range for turning, and turn left; turn on the right blinker, accelerate if the AV is stopped or below the threshold range for turning, and turn right; decelerate until completely stopped and reverse; etc.), and select the best one to meet changing road conditions and events.

The control stack 1318 may manage the operation of the vehicle propulsion system 1330, the braking system 1332, the steering system 1334, the safety system 1336, and the cabin system 1338. The control stack 1318 may receive sensor signals from the sensor systems 1304-1308 as well as communicate with other stacks or components of the compute system 110 or a remote system (e.g., the data center 1350) to effectuate operation of the AV 102. For example, the control stack 1318 may implement the final path or actions from the multiple paths or actions provided by the planning stack 1316. Implementation may involve turning the routes and decisions from the planning stack 1316 into commands for the actuators that control the AV's steering, throttle, brake, and drive unit.

The communication stack 1320 may transmit and receive signals between the various stacks and other components of the AV 102 and between the AV 102, the data center 1350, the client computing device 1370, and other remote systems. The communication stack 1320 may enable the compute system 110 to exchange information remotely over a network. The communication stack 1320 may also facilitate local exchange of information, such as through a wired connection or a local wireless connection.

The HD geospatial database 1322 may store HD maps and related data of the streets upon which the AV 102 travels. In some embodiments, the HD maps and related data may comprise multiple layers, such as an areas layer, a lanes and boundaries layer, an intersections layer, a traffic controls layer, and so forth. The areas layer may include geospatial information indicating geographic areas that are drivable (e.g., roads, parking areas, shoulders, etc.) or not drivable (e.g., medians, sidewalks, buildings, etc.), drivable areas that constitute links or connections (e.g., drivable areas that form the same road) versus intersections (e.g., drivable areas where two or more roads intersect), and so on. The lanes and boundaries layer may include geospatial information of road lanes (e.g., lane or road centerline, lane boundaries, type of lane boundaries, etc.) and related attributes (e.g., direction of travel, speed limit, lane type, etc.). The lanes and boundaries layer may also include 3D attributes related to lanes (e.g., slope, elevation, curvature, etc.). The intersections layer may include geospatial information of intersections (e.g., crosswalks, stop lines, turning lane centerlines, and/or boundaries, etc.) and related attributes. The traffic controls layer may include geospatial information of traffic signal lights, traffic signs, and other road objects and related attributes.

The AV operational database 1324 may store raw AV data generated by the sensor systems 1304-708 and other components of the AV 102 and/or data received by the AV 102 from remote systems (e.g., the data center 1350, the client computing device 1370, etc.). In some embodiments, the raw AV data may include HD LIDAR point cloud data, image or video data, RADAR data, GPS data, and other sensor data that the data center 1350 may use for creating or updating AV geospatial data as discussed further below and elsewhere in the present disclosure.

Data center 1350 may be a private cloud (e.g., an enterprise network, a co-location provider network, etc.), a public cloud (e.g., an IaaS network, a PaaS network, a SaaS network, or other CSP network), a hybrid cloud, a multi-cloud, and so forth. Data center 1350 may include one or more computing devices remote to the compute system 110 for managing a fleet of AVs and AV-related services. For example, in addition to managing the AV 102, the data center 1350 may also support a ridesharing (or ridehailing) service, a delivery service, a remote/roadside assistance service, street services (e.g., street mapping, street patrol, street cleaning, street metering, parking reservation, etc.), and the like.

Data center 1350 may send and receive various signals to and from the AV 102 and the client computing device 1370. These signals may include sensor data captured by the sensor systems 1304-1308, roadside assistance requests, software updates, ridesharing (or ridehailing) pick-up and drop-off instructions, and so forth. In this example, the data center 1350 includes one or more of device software management platform 1380, a data management platform 1352, an Artificial Intelligence/Machine Learning (AI/ML) platform 1354, a remote assistance platform 1358, a ridesharing (or ridehailing) platform 1360, and a map management platform 1362, among other systems.

Device software management platform 1380 may include a system to store manifests and/or configuration files that prescribes or controls the edge devices and the software versions running on the edge devices of AVs in a fleet of AVs (e.g., AV 102). Device software management platform 1380 may include a system to store and maintain configuration files for branded edge devices and/or configuration data files for monitors. Device software management platform 1380 may provide configuration information that corresponds to AV 102 to AV 102. Device software management platform 1380 may include a system to store and maintain software artifacts for edge devices on various AVs in a fleet of AVs (e.g., AV 102). Device software management platform 1380 may implement a build system to build software artifacts for an edge devices diagnostics system. Device software management platform 1380 may implement a software deployment system for deploying the software artifacts. Device software management platform 1380 may implement functionalities described with FIGS. 7A-B and 12.

Data management platform 1352 may be a "big data" system capable of receiving and transmitting data at high speeds (e.g., near real-time or real-time), processing a large variety of data, and storing large volumes of data (e.g., terabytes, petabytes, or more of data). The varieties of data may include data having different structures (e.g., structured, semi-structured, unstructured, etc.), data of different types (e.g., sensor data, mechanical system data, ridesharing (or ridehailing) service data, map data, audio data, video data, etc.), data associated with different types of data stores (e.g., relational databases, key-value stores, document databases, graph databases, column-family databases, data analytic stores, search engine databases, time series databases, object stores, file systems, etc.), data originating from different sources (e.g., AVs, enterprise systems, social networks, etc.), data having different rates of change (e.g., batch, streaming, etc.), or data having other heterogeneous characteristics. The various platforms and systems of data center 1350 may access data stored by the data management platform 1352 to provide their respective services.

The AI/ML platform 1354 may provide the infrastructure for training and evaluating machine learning algorithms for operating the AV 102, the remote assistance platform 1358, the ridesharing (or ridehailing) platform 1360, the map management platform 1362, and other platforms and systems. Using the AI/ML platform 1354, data scientists may prepare data sets from the data management platform 1352; select, design, and train machine learning models; evaluate, refine, and deploy the models; maintain, monitor, and retrain the models; and so on.

The remote assistance platform 1358 may generate and transmit instructions regarding the operation of the AV 102. For example, in response to an output of the AI/ML platform 1354 or other system of the data center 1350, the remote assistance platform 1358 may prepare instructions for one or more stacks or other components of the AV 102.

The ridesharing (or ridehailing) platform 1360 may interact with a customer of a ridesharing (or ridehailing) service via a ridesharing (or ridehailing) application 1372 executing on the client computing device 1370. In some cases, the client computing device 1370 may implement a delivery application 1372. The client computing device 1370 may be a suitable type of computing system, including a server, desktop computer, laptop, tablet, smartphone, smart wearable device (e.g., smart watch; smart eyeglasses or other Head-Mounted Display (HMD); smart car pods or other smart in-ear, on-car, or over-ear device; etc.), gaming system, or other general-purpose computing device for accessing the ridesharing (or ridehailing) application 1372. The client computing device 1370 may be a customer's mobile computing device or a computing device integrated with the AV 102 (e.g., the compute system 110). The ridesharing (or ridehailing) platform 1360 may receive requests to be picked up or dropped off from the ridesharing (or ridehailing) application 1372 and dispatch the AV 102 for the trip. Client computing device 1370 may be an example of an edge device 130 as seen in the figures.

Map management platform 1362 may provide a set of tools for the manipulation and management of geographic and spatial (geospatial) and related attribute data. The data management platform 1352 may receive LIDAR point cloud data, image data (e.g., still image, video, etc.), RADAR data, GPS data, and other sensor data (e.g., raw data) from one or more AVs (e.g., AV 102), Unmanned Aerial Vehicles (UAVs), satellites, third-party mapping services, and other sources of geospatially referenced data. In some embodiments, the map viewing services of map management platform 1362 may be modularized and deployed as part of one or more of the platforms and systems of the data center 1350. For example, the AI/ML platform 1354 may incorporate the map viewing services for visualizing the effectiveness of various object detection or object classification models, the remote assistance platform 1358 may incorporate the map viewing services for replaying traffic incidents to facilitate and coordinate aid, the ridesharing (or ridehailing) platform 1360 may incorporate the map viewing services into the client application 1372 to enable passengers to view the AV 102 in transit enroute to a pick-up or drop-off location, and so on.

Exemplary Processor-Based System

Figure 14:
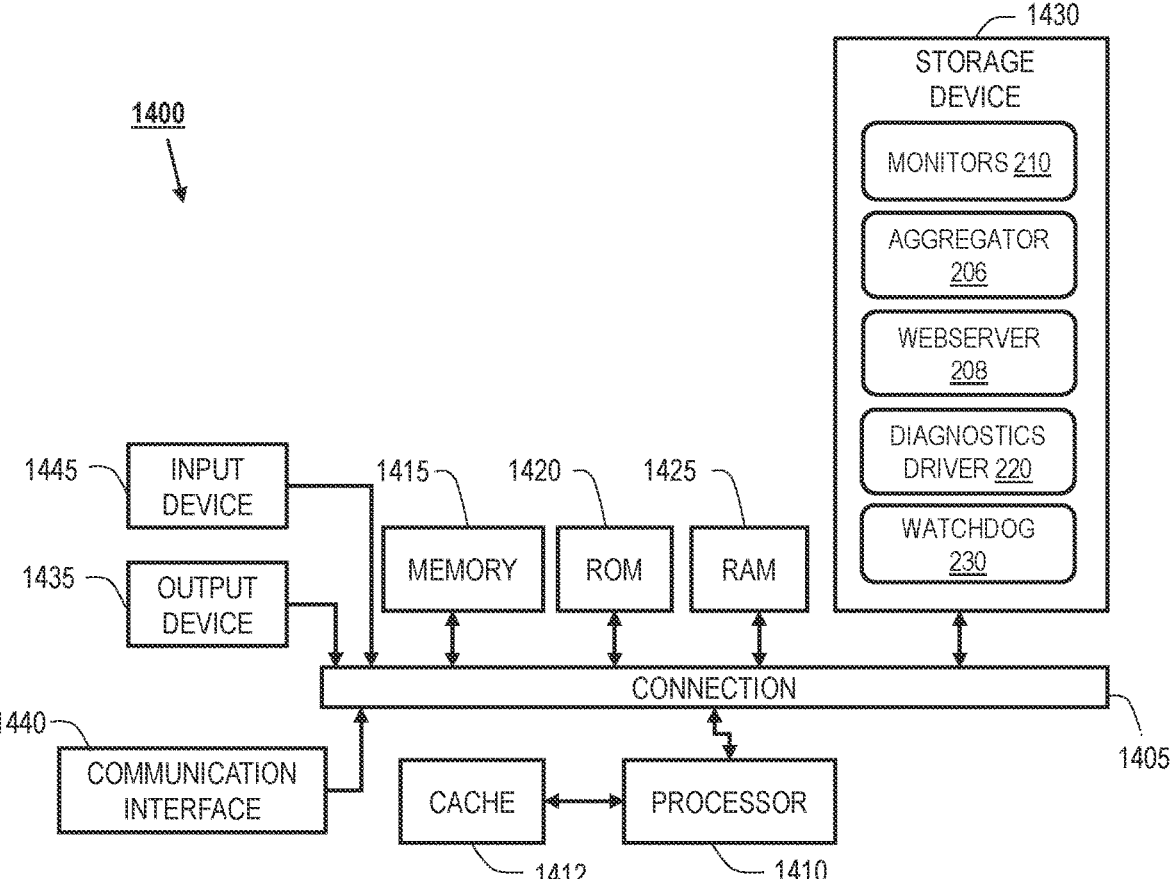
FIG. 14 illustrates an exemplary processor-based system with which some aspects of the subject technology may be implemented.

FIG. 14 illustrates an example processor-based system with which some aspects of the subject technology may be implemented. Edge devices and compute system described herein can processor-based systems. The processor-based systems may form a networked computing system in an AV. For example, processor-based system 1400 may be any computing device making up, or any component thereof in which the components of the system are in communication with each other using connection 1405. Connection 1405 may be a physical connection via a bus, or a direct connection into processor 1410, such as in a chipset architecture. Connection 1405 may also be a virtual connection, networked connection, or logical connection. Connection 1405 may be an example of inter-process communication.

In some embodiments, computing system 1400 is a distributed system in which the functions described in this disclosure may be distributed within a datacenter, multiple data centers, a peer network, etc. In some embodiments, one or more of the described system components represents many such components each performing some or all of the function for which the component is described. In some embodiments, the components may be physical or virtual devices.

Example system 1400 includes at least one processing unit (Central Processing Unit (CPU), Graphical Processing Unit (GPU), Machine Learning processor, microprocessor, or other suitable processor) 1410 and connection 1405 that couples various system components including system memory 1415, such as Read-Only Memory (ROM) 1420 and Random-Access Memory (RAM) 1425 to processor 1410. Computing system 1400 may include a cache of high-speed memory 1412 connected directly with, in close proximity to, or integrated as part of processor 1410.

Processor 1410 may include any general-purpose processor and a hardware service or software service, implementing functionalities encoded as instructions stored on storage device 1430 as illustrated in the figures. Processor 1410 may essentially be a completely self-contained computing system, containing multiple cores or processors, a bus, memory controller, cache, etc. A multi-core processor may be symmetric or asymmetric.

To enable user interaction, computing system 1400 includes an input device 1445, which may represent any number of input mechanisms, such as a microphone for speech, a touch-sensitive screen for gesture or graphical input, keyboard, mouse, motion input, speech, etc. Computing system 1400 may also include output device 1435, which may be one or more of a number of output mechanisms known to those of skill in the art. In some instances, multimodal systems may enable a user to provide multiple types of input/output to communicate with computing system 1400. Computing system 1400 may include communications interface 1440, which may generally govern and manage the user input and system output. The communication interface may perform or facilitate receipt and/or transmission wired or wireless communications via wired and/or wireless transceivers.

Communication interface 1440 may also include one or more GNSS receivers or transceivers that are used to determine a location of the computing system 1400 based on receipt of one or more signals from one or more satellites associated with one or more GNSS systems. GNSS systems include, but are not limited to, the US-based GPS, the Russia-based Global Navigation Satellite System (GLO-NASS), the China-based BeiDou Navigation Satellite System (BDS), and the Europe-based Galileo GNSS. There is no restriction on operating on any particular hardware arrangement, and therefore the basic features here may easily be substituted for improved hardware or firmware arrangements as they are developed.

Storage device 1430 may be a non-volatile and/or non-transitory and/or computer-readable memory device and may be a hard disk or other types of computer-readable media which may store data that is accessible by a computer.

Storage device 1430 may include software services, servers, services, radios (e.g., transceivers), etc., that when the code that defines such software is executed by the processor 1410, it causes the system 1400 to perform a function. In some embodiments, a hardware service that performs a particular function may include the software component stored in a computer-readable medium in connection with the necessary hardware components, such as processor 1410, connection 1405, output device 1435, etc., to carry out the function.

Storage device 1430 may include instructions encoded thereon to implement components such as monitors 210, aggregator 206, webserver 208, diagnostics driver 220, and watchdog 230, etc. The components and the functionalities being performed are illustrated in FIGS. 1-12.

Embodiments within the scope of the present disclosure may also include tangible and/or non-transitory computer-readable storage media or devices for carrying or having computer-executable instructions or data structures stored thereon. Such tangible computer-readable storage devices may be any available device that may be accessed by a general-purpose or special-purpose computer, including the functional design of any special-purpose processor as described above. By way of example, and not limitation, such tangible computer-readable devices may include RAM, ROM, EEPROM, CD-ROM or other optical disk storage, magnetic disk storage or other magnetic storage devices, or any other device which may be used to carry or store desired program code in the form of computer-executable instruc- tions, data structures, or processor chip design. When infor- mation or instructions are provided via a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable storage devices.

Computer-executable instructions include, for example, instructions and data which cause a general-purpose com- puter, special-purpose computer, or special-purpose process- ing device to perform a certain function or group of func- tions. Computer-executable instructions also include program modules that are executed by computers in stand- alone or networked environments. Generally, program mod- ules include routines, programs, components, data struc- tures, objects, and the functions inherent in the design of special-purpose processors, etc. that perform tasks or imple- ment abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Other embodiments of the disclosure may be practiced in networked computing environments with many types of computer system configurations, including personal com- puters, hand-held devices, multi-processor systems, micro- processor-based or programmable consumer electronics, network personal computers (PCs), minicomputers, main- frame computers, and the like. Embodiments may also be practiced in distributed computing environments where tasks are performed by local and remote processing devices that are linked (either by hardwired links, wireless links, or by a combination thereof) through a communications net- work. In a distributed computing environment, program modules may be located in both local and remote memory storage devices.

The various embodiments described above are provided by way of illustration only and should not be construed to limit the scope of the disclosure. For example, the principles herein apply equally to optimization as well as general improvements. Various modifications and changes may be made to the principles described herein without following the example embodiments and applications illustrated and described herein, and without departing from the spirit and scope of the disclosure. Claim language reciting "at least one of" a set indicates that one member of the set or multiple members of the set satisfy the claim.

Select Examples

Example 1 is a networked computing system for a vehicle, comprising: an edge device, having: a plurality of monitors to output payloads having edge device health status; and an aggregator to aggregate the payloads from the plurality of monitors and to transmit User Datagram Protocol (UDP) packets having the aggregated payloads over a network; a compute system, having: a diagnostic driver to receive the UDP packets having the aggregated payloads over the network and to publish measurements of the edge device based on the received packets to one or more data topics corresponding to measurements of the edge device; and a watchdog to subscribe to the one or more data topics and determine from the one or more data topics whether the vehicle is in a degraded state.

In Example 2, the networked computing system of Example 1 can optionally include the edge device further including: a webserver to receive requests and to generate responses having information about one or more of: the aggregator, and the plurality of monitors.

In Example 3, the networked computing system of Example 1 or 2 can optionally include the plurality of monitors including: a standalone monitor to periodically query and check data about the edge device, and to report the data or a derivation of the data as payloads.

In Example 4, the networked computing system of any one of Examples 1-3 can optionally include the plurality of monitors including: a nested monitor implemented within a software application on the edge device that queries and checks data about the edge device, and to periodically report the data or a derivation of the data as payloads.

In Example 5, the networked computing system of any one of Examples 1-4 can optionally include each monitor in the plurality of monitors including: an application program- ming interface to receive requests and generate responses about the monitor.

In Example 6, the networked computing system of any one of Examples 1-5 can optionally include the plurality of monitors including: a first monitor operating at a first frequency; and a second monitor operating at a second frequency different from the first frequency.

In Example 7, the networked computing system of any one of Examples 1-6 can optionally include the diagnostic driver being dedicated to the aggregator, and listens for the packets having the aggregated payloads sent by the aggre- gator.

In Example 8, the networked computing system of any one of Examples 1-7 can optionally include the diagnostic driver being to publish a diagnostic fault in response to a fault detected in one or more of: the aggregated payloads, the aggregator, or one of the plurality of monitors.

Example A is a computing method for edge diagnostics reporting in a networked computing system of a vehicle, the computing method comprising: outputting payloads by a plurality of monitors of an edge device, the payloads having edge device health status; aggregating, by an aggregator of the edge device, the payloads from the plurality of monitors; transmitting, by the aggregator, User Datagram Protocol (UDP) packets having the aggregated payloads over a net- work; receiving, by a diagnostics driver on a compute system, the UDP packets having the aggregated payloads over the network; publishing, by the diagnostics driver, measurements of the edge device based on the received packets to one or more data topics corresponding to mea- surements of the edge device; subscribing, by a watchdog on the compute system, to the one or more data topics; and determining, by the watchdog, from the one or more data topics whether the vehicle is in a degraded state.

Example 9 is an edge device for a vehicle, comprising: a plurality of monitors, each monitor to: monitor data about the edge device, check the data against a threshold, wherein the threshold is defined in configuration information for the monitor, and periodically output payloads having edge device health status based on the checking; and an aggre- gator to aggregate the payloads from the plurality of moni- tors and to transmit User Datagram Protocol (UDP) packets having the aggregated payloads over a network to a diagnostics driver on a compute system of the vehicle.

In Example 10, the edge device of Example 9 can optionally include the plurality of monitors comprising a first monitor, and the first monitor including: an application programming interface to report existence of the monitor.

In Example 11, the edge device of Example 9 or 10 can optionally include the plurality of monitors comprising a first monitor, and the first monitor including: an application programming interface to report the configuration information of the monitor.

In Example 12, the edge device of any one of Examples 9-11 can optionally include the plurality of monitors comprising a first monitor, and the first monitor including: an application programming interface to accept a request to update the configuration information of the monitor based on an update specified in the request.

In Example 13, the edge device of any one of Examples 9-12 can optionally include the plurality of monitors comprising a first monitor, and the first monitor including: an application programming interface to accept a request to reset the configuration information of the monitor to a default configuration information.

In Example 14, the edge device of any one of Examples 9-13 can optionally include the plurality of monitors comprises a first monitor, and the first monitor including: an application programming interface to accept a request to replace values of a payload output by the first monitor with values specified in the request.

Example B is a computing method for edge diagnostics reporting in a networked computing system of a vehicle, the computing method comprising: monitoring, by a first monitor in a plurality of monitors on an edge device of the vehicle, data about the edge device; checking. by the first monitor, the data against a threshold, wherein the threshold is defined in configuration information corresponding to the first monitor; periodically outputting, by the first monitor, payloads having edge device health status based on the checking; aggregating, by an aggregator on the edge device, the payloads from the plurality of monitors; and transmitting, by the aggregator, User Datagram Protocol (UDP) packets having the aggregated payloads over a network to a diagnostics driver on a compute system of the vehicle.

Example 15 is an edge device for a vehicle, comprising: a plurality of monitors, comprising: a first monitor to periodically output first payloads having first edge device health status, and a second monitor to periodically output second payloads having second edge device health status; and an aggregator comprising: a payload listener to capture at least the first payloads and second payloads and to form aggregated payloads having the first payloads and second payloads, and a payload transmitter to transmit User Datagram Protocol (UDP) packets having the aggregated payloads over a network to a diagnostics driver on a compute system of the vehicle.

In Example 16, the edge device of Example 15 can optionally include the monitors outputting payloads asynchronously; the payload transmitter running at least at twice the fastest output rate of the monitors; and transmitting a UDP packet having any payloads captured by the payload listener during a period of the payload transmitter.

In Example 17, the edge device of Example 15 or 16 can optionally include the aggregator further including: an application programming interface to receive a request, and to return a last aggregated payload that is cached and sent by the payload transmitter.

In Example 18, the edge device of any one of Examples 15-17 can optionally include the aggregator further including: an application programming interface to receive a request, and to return a last first payload that is cached and received by the payload listener from the first monitor.

In Example 19, any one of Examples 15-18 can optionally include the aggregator further including: an application programming interface to receive a request to corrupt data in a UDP packet being transmitted by a payload transmitter.

In Example 20, the edge device of Example 19 can optionally include the data comprising a cyclic redundancy check code.

In Example 21, the edge device of any one of Examples 15-20 can optionally include the aggregator comprising: an application programming interface to receive a request to drop a received payload from one of the monitors in an aggregated payload.

In Example 22, the edge device of any one of Examples 15-21 can optionally include the aggregator further including: an application programming interface to receive a request to change a timestamp of a received payload from one of the monitors in an aggregated payload.

In Example 23, the edge device of any one of Examples 15-22 can optionally include the aggregator further including: an application programming interface to receive a request to change an output rate of the payload transmitter.

In Example 24, the edge device of any one of Examples 15-23 can optionally include the aggregator further including: an application programming interface to receive a request to report an erroneous amount of free disk space of the edge device.

In Example 25, the edge device of any one of Examples 15-24 can optionally include the aggregator further including: an application programming interface to receive a request to report a disk error.

In Example 25, the edge device of any one of Examples 15-24 can optionally include the aggregator further including: an application programming interface to receive a request to report a memory error.

In Example 26, the edge device of any one of Examples 15-25 can optionally include the aggregator further including: an application programming interface to receive a request to replace values of a first payload received by the payload listener from the first monitor with values specified in the request.

In Example 27, the edge device of any one of Examples 15-26 can optionally include the aggregator receiving the first payloads and the second payloads over an inter-process communication channel.

In Example 28, the edge device of any one of Examples 15-26 can optionally include the UDP packets having structured data.

In Example 29, the edge device of any one of Examples 15-27 can optionally include the aggregator further including: a converter to convert the aggregated payloads from structured data to blobs; and wherein the UDP packets have the blobs.

Example C is a computing method for edge diagnostics reporting in a networked computing system of a vehicle, the computing method comprising: periodically outputting, by a first monitor of an edge device of the vehicle, first payloads having first edge device health status; periodically outputting, by a second monitor of the edge device, second payloads having second edge device health status; capturing, by a payload listener of an aggregator of the edge device, at least the first payloads and second payloads from the plurality of monitors; forming, by the payload listener, aggregated payloads having the first payloads and second payloads; and transmitting, by a payload transmitter of the aggregator, User Datagram Protocol (UDP) packets having the aggregated payloads over a network to a diagnostics driver on a compute system of the vehicle.

Example 30 is an edge device for a vehicle, comprising: a plurality of monitors to publish payloads having edge device health status; an aggregator to capture the payloads from the plurality of monitors, to form aggregated payloads having the payloads, and to transmit User Datagram Protocol (UDP) packets having the aggregated payloads over a network to a diagnostics driver on a compute system of a vehicle; and a webserver implemented on the edge device, wherein the webserver is communicably coupled to one or more of: the monitors and the aggregator.

In Example 31, the edge device of Example 30 can optionally include the webserver discovering the monitors configured for the edge device at runtime and reports which monitors have been configured.

In Example 32, the edge device of Example 30 or 31 can optionally include the webserver discovering configuration information corresponding to the monitors and reports the configuration information.

In Example 33, the edge device of any one of Examples 30-32 can optionally include the webserver receiving a query targeted to a first monitor of the monitors; and in response to the query, the webserver querying the first monitor via an application programming interface of the first monitor.

In Example 34, the edge device of any one of Examples 30-33 can optionally include: the webserver receiving a request to change configuration information of a first monitor of the monitors; and in response to the request, the webserver requesting a change to the configuration information of the first monitor via an application programming interface of the first monitor.

In Example 35, the edge device of any one of Examples 30-34 can optionally include the webserver receiving a request to inject a fault in a first monitor of the monitors; and in response to the request, the webserver requesting the fault to be injected in first monitor via an application programming interface of the first monitor.

In Example 36, the edge device of any one of Examples 30-35 can optionally include the webserver receiving a request to report a cached aggregated payload in the aggregator; and in response to the request, the webserver requesting the cached aggregated payload from the aggregator via an application programming interface of the aggregator.

In Example 37, the edge device of any one of Examples 30-36 can optionally include the webserver receiving a request to report a cached payload received by the aggregator from a first monitor of the monitors; and in response to the request, the webserver requesting the cached payload from the aggregator via an application programming interface of the aggregator.

In Example 38, the edge device of any one of Examples 30-37 can optionally include the webserver receiving a request to inject a fault in the aggregator; and in response to the request, the webserver requesting the fault to be injected in the aggregator via an application programming interface of the aggregator.

Example D is a computing method for edge diagnostics reporting in a networked computing system of a vehicle, the computing method comprising: publishing, by a plurality of monitors of an edge device of the vehicle, payloads having edge device health status; capturing, by an aggregator of the edge device, the payloads from the plurality of monitors;

forming, by the aggregator, aggregated payloads having the payloads; transmitting, by the aggregator, User Datagram Protocol (UDP) packets having the aggregated payloads over a network to a diagnostics driver on a compute system of the vehicle; and receiving and responding to, by a webserver of the edge device, requests about one or more of: the monitors and the aggregator.

Example 39 is a method for building and deploying software artifacts for edge devices diagnostics in a networked computing system for a vehicle, the method comprising: receiving an indication that a first edge device is to use a first branded edge device diagnostics configuration file; retrieving the first branded edge device diagnostics configuration file, wherein the first branded edge device diagnostics configuration file specifies one or more monitors and corresponding network configuration of the one or more monitors; retrieving a first configuration data file corresponding to a first monitor in the one or more monitors, wherein the first configuration data file includes a name of the first monitor, a rate the first monitor reports at, data being monitored by the first monitor, and measurement configuration for the first monitor; triggering software code to be generated for the one or more monitors and an aggregator based on at least the first monitor configuration template and the first data file; generating software artifacts for the one or more monitors and an aggregator for the first edge device based on the software code; and transmitting and deploying the software artifacts onto the first edge device on the vehicle, wherein the software artifacts, when deployed onto the first edge device on the vehicle, causes edge device health status to be reported from the first edge device over a network to a compute system of the vehicle.

In Example 40, the method of Example 39 can optionally include the software artifacts comprising a first software artifact for the first monitor; and the first software artifact, when executed on the first edge device, causing the first monitor to produce payloads reporting health status of the first edge device according to the first configuration data file.

In Example 41, the method of Example 39 or 40 can optionally include the software artifacts comprising a second software artifact for the aggregator; and the second software artifact, when executed on the first edge device, causing the aggregator to aggregate payloads received from the one or more monitors and transmit aggregated payloads according to the branded edge device diagnostics configuration file.

In Example 42, the method of any one of Examples 39-41 can optionally include the first branded edge device diagnostics configuration file comprising a list of the one or more monitors, and one or more static Internet Protocol addresses corresponding to the one or more monitors.

In Example 43, the method of any one of Examples 39-42 can optionally include can optionally include the first branded edge device diagnostics configuration file comprising a list of the one or more monitors, and one or more dynamic peer Internet Protocol addresses corresponding to the one or more monitors.

In Example 44, the method of any one of Examples 39-43 can optionally include the first branded edge device diagnostics configuration file comprising a list of the one or more monitors; and a subset of the one or more monitors is conditionally run at runtime.

In Example 45, the method of any one of Examples 39-44 can optionally include the first branded edge device diagnostics configuration file comprising a list of the one or more monitors; and a subset of the one or more monitors is required to run at runtime.

Example 46 includes one or more non-transitory computer-readable media storing instructions that, when executed by one or more processors, cause the one or more processors to perform any one of the computer-implemented methods of Examples A-D and 39-45.

Example 47 is an apparatus comprising means to carry out any one of the computer-implemented methods of Examples A-D and 39-45.

The invention claimed is:

1. A networked computing system for a vehicle, comprising:

an edge device including a plurality of monitors to output payloads having edge device health status, and an aggregator to aggregate the payloads from the plurality of monitors and to transmit User Datagram Protocol (UDP) packets having the aggregated payloads over a network, wherein the plurality of monitors include a standalone monitor to periodically query and check a first data about the edge device, and to report the first data or a derivation of the first data as payloads, wherein a primary purpose of the first data is for checking by a watchdog of a degraded state and a nested monitor implemented within a software application on the edge device that queries and checks a second data about the edge device, and to periodically report the second data or a derivation of the second data as payloads, wherein a primary purpose of the second data is for use by the software application;

wherein the edge device is a sensor and wherein the edge device health status is health status information of the edge device, and wherein the edge device health status in the output payloads includes at least one of processor utilization of the edge device, memory utilization of the edge device, number of memory errors of the edge device, voltage of the edge device, temperature of the edge device, and a certain value of the edge device crossing a threshold and a timeout occurring within the edge device;

a compute system, having:

a diagnostic driver to receive the UDP packets having the aggregated payloads over the network and to publish measurements of the edge device based on the received UDP packets to one or more data topics corresponding to measurements of the edge device; and the watchdog to subscribe to the one or more data topics and determine from the one or more data topics whether the vehicle is in the degraded state.

2. The networked computing system of claim 1, wherein the edge device further includes:

a webserver to receive requests and to generate responses having information about one or more of: the aggregator, and the plurality of monitors.

3. The networked computing system of claim 1, wherein each monitor in the plurality of monitors includes:

an application programming interface to receive requests and generate responses about the monitor.

4. The networked computing system of claim 1, wherein the plurality of monitors include:

a first monitor operating at a first frequency; and a second monitor operating at a second frequency different from the first frequency.

5. The networked computing system of claim 1, wherein the diagnostic driver is dedicated to the aggregator, and listens for the packets having the aggregated payloads sent by the aggregator.

6. The networked computing system of claim 1, wherein the diagnostic driver is to publish a diagnostic fault in response to a fault detected in one or more of: the aggregated payloads, the aggregator, or one of the plurality of monitors.

7. The networked computing system of claim 1, wherein the measurements are published as an array of key-value pairs, including a set of measurements corresponding to a specific monitor from the plurality of monitors and a topic corresponding to the set of measurements, wherein the topic corresponding to the set of measurements is identified with an identifier of the specific monitor, an identifier of the edge device, an identifier of a namespace, and an identifier of the set of measurements.

8. The networked computing system of claim 1, wherein the edge device health status further includes at least one of error codes from the edge device, failure codes from the edge device, and err/fault/occurrence counters of the edge device.

9. An edge device for a vehicle, comprising:

a plurality of monitors, comprising: a first monitor to periodically output first payloads having first edge device health status, and a second monitor to periodically output second payloads having second edge device health status, wherein the plurality of monitors include a standalone monitor to periodically query and check a first data about the edge device, and to report the first data or a derivation of the first data as payloads, wherein a primary purpose of the first data is for checking by a watchdog of a degraded state and a nested monitor implemented within a software application on the edge device that queries and checks a second data about the edge device, and to periodically report the second data or a derivation of the second data as payloads wherein a primary purpose of the second data is for use by the software application;

wherein the first edge device health status is a first set of health status information of the edge device and wherein the second edge device health status is a second set of health status information of the edge device, and wherein the edge device health status included in the output payloads includes at least one of processor utilization of the edge device, memory utilization of the edge device, number of memory errors of the edge device, voltage of the edge device, temperature of the edge device, and a certain value of the edge device crossing a threshold and a timeout occurring within the edge device;

an aggregator comprising: a payload listener to capture at least the first payloads and the second payloads and to form aggregated payloads having the first payloads and the second payloads, and a payload transmitter to transmit User Datagram Protocol (UDP) packets having the aggregated payloads over a network to a diagnostics driver on a compute system of the vehicle; and wherein the edge device is a sensor.

10. The edge device of claim 9, wherein:

the monitors output payloads asynchronously;

the payload transmitter runs at least at twice the fastest output rate of the monitors; and transmits a UDP packet having any payloads captured by the payload listener during a period of the payload transmitter.

11. The edge device of claim 9, wherein the aggregator further includes:

an application programming interface to receive a request, and to return a last aggregated payload that is cached and sent by the payload transmitter.

12. The edge device of claim 9, wherein the aggregator further includes:

an application programming interface to receive a request, and to return a last first payload that is cached and received by the payload listener from the first monitor.

13. The edge device of claim 9, wherein the aggregator comprises:

an application programming interface to receive a request to corrupt data in a UDP packet being transmitted by a payload transmitter; and wherein the data comprises a cyclic redundancy check code.

14. The edge device of claim 9, wherein the aggregator comprises:

an application programming interface to receive a request to drop a received payload from one of the monitors in an aggregated payload.

15. The edge device of claim 9, wherein the aggregator comprises:

an application programming interface to receive a request to replace values of a first payload received by the payload listener from the first monitor with values specified in the request.

16. The edge device of claim 9, wherein the aggregator receives the first payloads and the second payloads over an inter-process communication channel.

17. The edge device of claim 9, wherein the UDP packets have structured data.

18. The edge device of claim 9, wherein the aggregator further includes:

a converter to convert the aggregated payloads from structured data to blobs; and wherein the UDP packets have the blobs.

* * * * *